(12) United States Patent
Wang et al.

(10) Patent No.: US 12,149,319 B2
(45) Date of Patent: Nov. 19, 2024

(54) COMMUNICATION METHOD AND APPARATUS

(71) Applicant: Huawei Technologies Co., Ltd., Shenzhen (CN)

(72) Inventors: Bichai Wang, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/039,886

(22) PCT Filed: Nov. 30, 2021

(86) PCT No.: PCT/CN2021/134417
§ 371 (c)(1),
(2) Date: Jun. 1, 2023

(87) PCT Pub. No.: WO2022/116966
PCT Pub. Date: Jun. 9, 2022

(65) Prior Publication Data
US 2024/0007173 A1    Jan. 4, 2024

(30) Foreign Application Priority Data

Dec. 2, 2020 (CN) .......................... 202011398679.6
Dec. 30, 2020 (CN) ......................... 202011613147.X

(51) Int. Cl.
*H04B 7/06* (2006.01)
*H04W 72/0453* (2023.01)
*H04W 72/1268* (2023.01)

(52) U.S. Cl.
CPC .... *H04B 7/06952* (2023.05); *H04W 72/0453* (2013.01); *H04W 72/1268* (2013.01)

(58) Field of Classification Search
CPC .......... H04B 7/06952; H04W 72/0453; H04W 72/1268; H04W 72/23; H04L 5/0023; H04L 5/001; H04L 5/0051; H04L 5/0094
See application file for complete search history.

(56) References Cited

U.S. PATENT DOCUMENTS

2016/0295575 A1* 10/2016 Dinan ................. H04W 52/146
2017/0302419 A1* 10/2017 Liu ....................... H04L 5/0078
2019/0268185 A1* 8/2019 Wang ................. H04L 27/2613

* cited by examiner

*Primary Examiner* — Sung S Ahn
(74) *Attorney, Agent, or Firm* — Slater Matsil, LLP

(57) ABSTRACT

In accordance with an embodiment, a method includes sending a first message to a network device includes capability information of a terminal device that indicates antenna ports supported by P frequency domain units of the terminal device, and an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units; and receiving configuration information from the network device, where the configuration information configures at least two sounding reference signal (SRS) resources for a first frequency domain unit of the terminal device, and the first frequency domain unit is associated with first uplink transmission configuration information.

20 Claims, 9 Drawing Sheets

COMMUNICATION METHOD AND APPARATUS

CROSS-REFERENCE TO RELATED APPLICATIONS

This application is a National Stage of International Application No. PCT/CN2021/134417, filed on Nov. 30, 2021, which claims priority to Chinese Patent Application No. 202011398679.6, filed on Dec. 2, 2020 and Chinese Patent Application No. 202011613147.X, filed on Dec. 30, 2020. All of the aforementioned applications are hereby incorporated by reference in their entireties.

TECHNICAL FIELD

This application relates to the field of communication technologies, and in particular, to a communication method and apparatus.

BACKGROUND

With diversified development of services such as a mobile Internet service and an Internet of things service, mobile communication has an increasing requirement on uploading massive data. For example, services such as an ultra-high-definition video, intelligent surveillance, and a virtual reality (VR) live video pose a high requirement on an uplink (UL) capacity. Currently, sub-6G commercial frequency bands of a mainstream 5th generation (5G) mobile communication system are mainly medium-high frequency bands such as 2.6 GHz, 3.5 GHz, and 4.9 GHz, a time division duplex (TDD) standard is usually used, and there are problems such as a large path loss and a low uplink duty cycle. As a result, the uplink capacity is insufficient.

An existing uplink enhancement solution mainly includes implementing coordinated transmission on a plurality of frequencies by using technologies such as carrier aggregation (CA) and supplementary uplink (SUL), so that spectrum resource utilization or uplink coverage can be improved to an extent. However, to meet a requirement of diversified service development, the uplink capacity needs to be further improved.

SUMMARY

Embodiments of this application provide a communication method and apparatus, to improve uplink performance.

According to a first aspect, a communication method is provided. The method may be performed by a terminal device, or may be performed by a chip system, where the chip system can implement functions of the terminal device. The method includes: sending a first message to a network device, where the first message includes capability information of the terminal device, the capability information indicates antenna ports supported by P frequency domain units of the terminal device, an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not include the $i^{th}$ frequency domain unit, at least two of the P frequency domain units are associated with respective uplink transmission configuration information, P is an integer greater than 1, and $N_i$ is an integer greater than or equal to 1 and less than P; and receiving configuration information from the network device, where the configuration information is used to configure at least two SRS resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

In this embodiment of this application, one or more antenna ports included in the terminal device can be connected to a switch, and radio frequency links associated with more frequency domain units can be switched by using the switch, so that information about carriers associated with more radio frequency links can be sent. In other words, in this embodiment of this application, antenna ports are switched between radio frequency links of different frequency domain units, so that one radio frequency link can be connected to more antenna ports. In this case, a single frequency domain unit can support more antenna ports, and flexibility is high, so that uplink transmission performance is improved.

With reference to the first aspect, in a first optional implementation of the first aspect, that the capability information indicates antenna ports supported by P frequency domain units of the terminal device includes: The capability information indicates an index $x_i$ of the antenna port supported by the $i^{th}$ frequency domain unit in the P frequency domain units, $x_i$ is an integer greater than or equal to 1 and less than or equal to $N_t$, or $x_i$ is a nonnegative integer less than $N_t$, and $N_t$ is a total quantity of antenna ports associated with the P frequency domain units; or the capability information indicates a total quantity $N_t$ of antenna ports of the terminal device, and the P frequency domain units are associated with the $N_t$ antenna ports. The capability information may indicate indexes of the antenna ports supported by the P frequency domain units. In this manner, an indication of the capability information is clearer, and this helps the network device learn a capability of the UE more clearly. Alternatively, the capability information may indicate the total quantity of antenna ports, and an antenna port supported by each frequency domain unit does not need to be distinguished. This manner helps reduce signaling overheads.

With reference to the first aspect, in a second optional implementation of the first aspect, that the capability information indicates antenna ports supported by P frequency domain units of the terminal device includes: The capability information indicates a quantity M of antenna ports associated with the $i^{th}$ frequency domain unit in the P frequency domain units, the first message further includes first information, the first information indicates information that the $M_i$ antenna ports can be switched to a $j^{th}$ frequency domain unit, i is not equal to j, and i and j are integers greater than or equal to 1 and less than or equal to P. This manner is equivalent to adding new information based on existing information by using the existing information, to indicate the antenna ports supported by the P frequency domain units. For example, if the quantity of antenna ports associated with the P frequency domain units is the existing information, the first information may be further added to the first message, and the antenna ports supported by the P frequency domain units may be indicated by using the existing information and the first information. The existing information indicates a feature of this embodiment of this application, thereby improving utilization of the existing information.

With reference to the second optional implementation of the first aspect, in a third optional implementation of the first aspect, that the first information indicates information that the $M_i$ antenna ports can be switched to a $j^{th}$ frequency domain unit includes: The first information indicates a quantity of antenna ports that can be switched to the $j^{th}$ frequency domain unit in the $M_i$ antenna ports; or the first information indicates that an $m^{th}$ antenna port in the $M_i$ antenna ports can be switched to the $j^{th}$ frequency domain unit, where m=1, 2, . . . , or $M_i$, or m=0, 1, . . . , or $M_i$–1. The first information also has different indication manners, and may indicate the quantity of antenna ports that can be switched to the $j^{th}$ frequency domain unit in the $M_i$ antenna ports. This manner is simple, and helps reduce signaling overheads. Alternatively, the first information may indicate which antenna port can be switched to the $j^{th}$ frequency domain unit, so that an indication is clearer.

With reference to any one of the first aspect, or the first optional implementation of the first aspect to the third optional implementation of the first aspect, in a fourth optional implementation of the first aspect, the configuration information is further used to configure an association relationship between different SRS ports of the at least two SRS resources and different antenna ports supported by the first frequency domain unit, and there is an association relationship between one SRS port and one antenna port, to indicate the terminal device to send an SRS of the SRS port through the antenna port. That an SRS port is associated with an antenna port may be understood as that an SRS of the SRS port is sent through the antenna port. The association relationship between an antenna port and an SRS port is configured, so that the terminal device can determine which antenna port is used to send an SRS corresponding to an SRS port. After receiving the SRS corresponding to the SRS port, the network device also can determine which antenna of the terminal device is used for sending, so that the network device can perform channel estimation on an uplink channel corresponding to the antenna, to schedule the terminal device more accurately.

With reference to any one of the first aspect, or the first optional implementation of the first aspect to the fourth optional implementation of the first aspect, in a fifth optional implementation of the first aspect, the configuration information is further used to configure a second SRS resource for a second frequency domain unit of the terminal device. If the second SRS resource and a first SRS resource occupy a same time unit, the second SRS resource and the first SRS resource are not associated with a same antenna port. The first SRS resource is one of the at least two SRS resources. It may be understood that one antenna port is used to send information on only one carrier at one moment, thereby facilitating scheduling of the network device and avoiding confusion.

With reference to any one of the first aspect, or the first optional implementation of the first aspect to the fifth optional implementation of the first aspect, in a sixth optional implementation of the first aspect, the method further includes: receiving scheduling information from the network device, where the scheduling information is used to schedule uplink data on the first frequency domain unit, the scheduling information further includes second information, and the second information indicates an SRS port that is of an SRS resource and that is associated with an antenna port for sending the uplink data; and sending the uplink data to the network device through the antenna port associated with the SRS port of the SRS resource. When scheduling the terminal device to send the uplink data, the network device may indicate the antenna port used to send the uplink data, so that the terminal device may send the uplink data through the antenna port indicated by the network device. These antenna ports are, for example, determined by the network device based on channel estimation performed on the uplink channel corresponding to the antenna of the terminal device. Therefore, uplink transmission quality can be improved.

With reference to the sixth optional implementation of the first aspect, in a seventh optional implementation of the first aspect, the SRS port that is indicated by the second information and associated with the antenna port for sending the uplink data and that is of the SRS resource includes a first SRS port, the scheduling information further includes third information, and the third information indicates a phase of an antenna port associated with the first SRS port. In this embodiment of this application, the antenna port can be switched to radio frequency links associated with different carriers by using the switch, so that information on the different carriers can be sent. However, if a phase of the antenna port remains unchanged after the radio frequency links associated with different carriers are switched, sending performance may be poor when the antenna port is used to send information on some carriers. Therefore, in this embodiment of this application, the phase of the antenna port may be further adjusted. For example, a phase difference between a plurality of antenna ports connected to one radio frequency link is adjusted by using a phase shifter, so that a beamforming gain that can be obtained by each carrier of the terminal device can be flexibly adjusted, thereby improving uplink transmission performance.

According to a second aspect, another communication method is provided. The method may be performed by a network device, or may be performed by a chip system, where the chip system can implement functions of the network device. For example, the network device is an access network device, for example, a base station. The method includes: receiving a first message from a terminal device, where the first message includes capability information of the terminal device, the capability information indicates antenna ports supported by P frequency domain units of the terminal device, an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not include the $i^{th}$ frequency domain unit, at least two of the P frequency domain units are associated with respective uplink transmission configuration information, P is an integer greater than 1, and $N_i$ is an integer greater than or equal to 1 and less than P; and sending configuration information to the terminal device, where the configuration information is used to configure at least two SRS resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

With reference to the second aspect, in a first optional implementation of the second aspect, that the capability information indicates antenna ports supported by P frequency domain units of the terminal device includes: The capability information indicates an index $x_i$ of the antenna port supported by the $i^{th}$ frequency domain unit in the P frequency domain units, $x_i$ is an integer greater than or equal to 1 and less than or equal to $N_t$, or $x_i$ is a nonnegative integer less than $N_t$, and $N_t$ is a total quantity of antenna ports associated with the P frequency domain units; or the capability information indicates a total quantity $N_t$ of antenna ports of the terminal device, and the P frequency domain units are associated with the $N_t$ antenna ports.

With reference to the second aspect, in a second optional implementation of the second aspect, that the capability information indicates antenna ports supported by P frequency domain units of the terminal device includes: The capability information indicates a quantity $M_i$ of antenna ports associated with the $i^{th}$ frequency domain unit in the P frequency domain units, the first message further includes first information, the first information indicates information that the $M_i$ antenna ports can be switched to a $j^{th}$ frequency domain unit, i is not equal to j, and i and j are integers greater than or equal to 1 and less than or equal to P.

With reference to the second optional implementation of the second aspect, in a third optional implementation of the second aspect, that the first information indicates information that the $M_i$ antenna ports can be switched to a $j^{th}$ frequency domain unit includes: The first information indicates a quantity of antenna ports that can be switched to the $j^{th}$ frequency domain unit in the $M_i$ antenna ports; or the first information indicates that an $m^{th}$ antenna port in the $M_i$ antenna ports can be switched to the $j^{th}$ frequency domain unit, where m=i, 2, . . . , or $M_i$, or m=0, 1, . . . , or $M_i-1$.

With reference to any one of the second aspect, or the first optional implementation of the second aspect to the third optional implementation of the second aspect, in a fourth optional implementation of the second aspect, the configuration information is further used to configure an association relationship between different SRS ports of the at least two SRS resources and different antenna ports supported by the first frequency domain unit, and there is an association relationship between one SRS port and one antenna port, to indicate the terminal device to send an SRS of the SRS port through the antenna port.

With reference to any one of the second aspect, or the first optional implementation of the second aspect to the fourth optional implementation of the second aspect, in a fifth optional implementation of the second aspect, the configuration information is further used to configure a second SRS resource for a second frequency domain unit of the terminal device. If the second SRS resource and a first SRS resource occupy a same time unit, the second SRS resource and the first SRS resource are not associated with a same antenna port. The first SRS resource is one of the at least two SRS resources.

With reference to any one of the second aspect, or the first optional implementation of the second aspect to the fifth optional implementation of the second aspect, in a sixth optional implementation of the second aspect, the method further includes: when a first condition is met, sending new configuration information to the terminal device, where the new configuration information is used to configure at least one SRS resource for the first frequency domain unit. The network device may send the configuration information to UE only once, and does not change the configuration information after sending. For example, the network device sends the configuration information to the UE after the UE succeeds in random access, and does not change the configuration information after sending. Alternatively, the network device may update the configuration information. For example, when the first condition is met, the network device may send the new configuration information to the UE. The new configuration information is still used to configure an SRS resource for a carrier of the UE. In this way, a configuration of the SRS resource can be more consistent with a current network state, to obtain better uplink sending performance.

With reference to the sixth optional implementation of the second aspect, in a seventh optional implementation of the second aspect, the configuration information is further used to configure an association relationship between an SRS port of the at least one SRS resource and the antenna port supported by the first frequency domain unit. Alternatively, the association relationship may be determined by using a predefined rule. For example, the predefined rule may be included in a protocol, and the association relationship does not need to be configured in the configuration information.

With reference to the sixth optional implementation of the second aspect or the seventh optional implementation of the second aspect, in an eighth optional implementation of the second aspect, the first condition includes one or more of the following: Uplink channel quality of the terminal device is lower than a first threshold; duration between start time and current time reaches first duration, where time at which the configuration information is sent is used as the start time; the terminal device is handed over to a new cell; a value of a first parameter of the terminal device changes; or trigger information from the terminal device is received, where the trigger information indicates to reconfigure an SRS resource. In these cases, a channel condition may change. Therefore, the configuration information may be updated in these cases, to obtain better uplink sending performance. Certainly, the first condition is not limited thereto.

With reference to any one of the second aspect, or the first optional implementation of the second aspect to the eighth optional implementation of the second aspect, in a ninth optional implementation of the second aspect, the method further includes: sending scheduling information to the terminal device, where the scheduling information is used to schedule uplink data on the first frequency domain unit, the scheduling information further includes second information, and the second information indicates an SRS port that is of an SRS resource and that is associated with an antenna port for sending the uplink data; and sending, by the terminal device, the uplink data to the network device through the antenna port associated with the SRS port of the SRS resource.

With reference to the ninth optional implementation of the second aspect, in a tenth optional implementation of the second aspect, the SRS port that is indicated by the second information and associated with the antenna port for sending the uplink data and that is of the SRS resource includes a first SRS port, the scheduling information further includes third information, and the third information indicates a phase of an antenna port associated with the first SRS port.

For technical effect brought by the second aspect or the optional implementations of the second aspect, refer to the descriptions of the technical effect brought by the first aspect or the corresponding implementations.

According to a third aspect, a communication apparatus is provided. The communication apparatus is, for example, a terminal device, or may be a component such as a chip disposed in a terminal device. The communication apparatus may include at least one antenna port and N radio frequency links. One of the N radio frequency links includes an amplifier and a filter, the N radio frequency links are associated with H frequency domain units, and N is an integer greater than or equal to 2. A first antenna port in the at least one antenna port is connected to a first switch, and the first switch can be switched between M radio frequency links in the N radio frequency links. The communication apparatus further includes a first phase shifter connected to the first antenna port, the first phase shifter is configured to adjust a phase of the first antenna port, and M is an integer greater than or equal to 2. One or more antenna ports included in the terminal device can be connected to a switch, and radio frequency links associated with more frequency domain units can be switched by using the switch, so that information about carriers associated with more radio frequency links can be sent. In other words, in this embodiment of this application, antenna ports are switched between radio frequency links of different frequency domain units, so that one radio frequency link can be connected to more antenna ports, and a phase difference between a plurality of antenna ports connected to one radio frequency link is adjusted by using a phase shifter. A beamforming gain that can be obtained by each carrier of the terminal device may be flexibly adjusted, to improve uplink transmission performance.

With reference to the third aspect, in a first optional implementation of the third aspect, a second antenna port in the at least one antenna port is connected to a second switch, and the second switch can be switched between K radio frequency links in the N radio frequency links. The communication apparatus further includes a second phase shifter connected to the second antenna port, the second phase shifter is configured to adjust a phase of the second antenna port, and K is an integer greater than or equal to 2. For example, frequency domain units associated with the M radio frequency links may have an intersection with frequency domain units associated with the K radio frequency links. In this case, for a frequency domain unit included in the intersection, information about the frequency domain unit may be sent through the first antenna port, or may be sent through the second antenna port. In this way, a transmission gain and transmission reliability of the information are improved.

According to a fourth aspect, another communication apparatus is provided. The communication apparatus may be the terminal device according to either of the first aspect and the second aspect. The communication apparatus has functions of the terminal device. In an optional implementation, the communication apparatus includes a baseband apparatus and a radio frequency apparatus. In another optional implementation, the communication apparatus includes a processing unit (sometimes also referred to as a processing module) and a transceiver unit (sometimes also referred to as a transceiver module). The transceiver unit can implement a sending function and a receiving function. When the transceiver unit implements the sending function, the transceiver unit may be referred to as a sending unit. When the transceiver unit implements the receiving function, the transceiver unit may be referred to as a receiving unit. The sending unit and the receiving unit may be a same functional module. The functional module is referred to as the transceiver unit, and the functional module can implement the sending function and the receiving function. Alternatively, the sending unit and the receiving unit may be different functional modules, and the transceiver unit is a collective name for these functional modules.

Optionally, this communication apparatus and the communication apparatus according to the third aspect may be different communication apparatuses, or may be a same communication apparatus. If this communication apparatus and the communication apparatus according to the third aspect are a same communication apparatus, the transceiver unit included in the communication apparatus may include the at least one antenna port and the N radio frequency links according to the third aspect, or include the N radio frequency links according to the third aspect. Alternatively, the transceiver unit included in the communication apparatus may be implemented by using the at least one antenna port and the N radio frequency links according to the third aspect. Alternatively, the transceiver unit included in the communication apparatus may be implemented by using the N radio frequency links according to the third aspect.

For example, the sending unit is configured to send a first message to a network device, where the first message includes capability information of the terminal device, the capability information indicates antenna ports supported by P frequency domain units of the terminal device, an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not include the $i^{th}$ frequency domain unit, at least two of the P frequency domain units are associated with respective uplink transmission configuration information, P is an integer greater than 1, and $N_i$ is an integer greater than or equal to 1 and less than P.

The receiving unit is configured to receive configuration information from the network device, where the configuration information is used to configure at least two SRS resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

Alternatively, the processing unit is configured to send a first message to a network device through the transceiver unit, where the first message includes capability information of the terminal device, the capability information indicates antenna ports supported by P frequency domain units of the terminal device, an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not include the $i^{th}$ frequency domain unit, at least two of the P frequency domain units are associated with respective uplink transmission configuration information, P is an integer greater than 1, and $N_i$ is an integer greater than or equal to 1 and less than P.

The processing unit is further configured to receive configuration information from the network device through the transceiver unit, where the configuration information is used to configure at least two SRS resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

In another optional implementation, the communication apparatus includes a storage unit and a processing unit. The processing unit is configured to be coupled to the storage unit, and execute a program or instructions in the storage unit, to enable the communication apparatus to perform the functions of the terminal device.

According to a fifth aspect, another communication apparatus is provided. The communication apparatus may be the network device according to either of the first aspect and the second aspect. The communication apparatus has functions of the network device. The network device is, for example, a base station, or a baseband apparatus in a base station. In an optional implementation, the communication apparatus includes a baseband apparatus and a radio frequency apparatus. In another optional implementation, the communication apparatus includes a processing unit (sometimes also referred to as a processing module) and a transceiver unit (sometimes also referred to as a transceiver module). For an implementation of the transceiver unit, refer to the description of the fourth aspect.

For example, the receiving unit is configured to receive a first message from a terminal device, where the first message includes capability information of the terminal device, the capability information indicates antenna ports supported by P frequency domain units of the terminal device, an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not include the $i^{th}$ frequency domain unit, at least two of the P frequency domain units are associated with respective uplink transmission configuration information, P is an integer greater than 1, and $N_i$ is an integer greater than or equal to 1 and less than P.

The sending unit is configured to send configuration information to the terminal device, where the configuration information is used to configure at least two SRS resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

Alternatively, the processing unit is configured to receive a first message from a terminal device through the transceiver unit, where the first message includes capability information of the terminal device, the capability information indicates antenna ports supported by P frequency domain units of the terminal device, an antenna port supported by an $i^{th}$ frequency domain unit in the P frequency domain units includes an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not include the $i^{th}$ frequency domain unit, at least two of the P frequency domain units are associated with respective uplink transmission configuration information, P is an integer greater than 1, and $N_i$ is an integer greater than or equal to 1 and less than P.

The processing unit is further configured to send configuration information to the terminal device through the transceiver unit, where the configuration information is used to configure at least two SRS resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

In another optional implementation, the communication apparatus includes a storage unit and a processing unit. The processing unit is configured to be coupled to the storage unit, and execute a program or instructions in the storage unit, to enable the communication apparatus to perform the functions of the network device.

According to a sixth aspect, a computer-readable storage medium is provided. The computer-readable storage medium is configured to store a computer program or instructions. When the computer program or the instructions is/are run, the method performed by the terminal device or the network device in the foregoing aspects is implemented.

According to a seventh aspect, a computer program product including instructions is provided. When the computer program product runs on a computer, the methods in the foregoing aspects are implemented.

DETAILED DESCRIPTION OF ILLUSTRATIVE EMBODIMENTS

Figure 1:
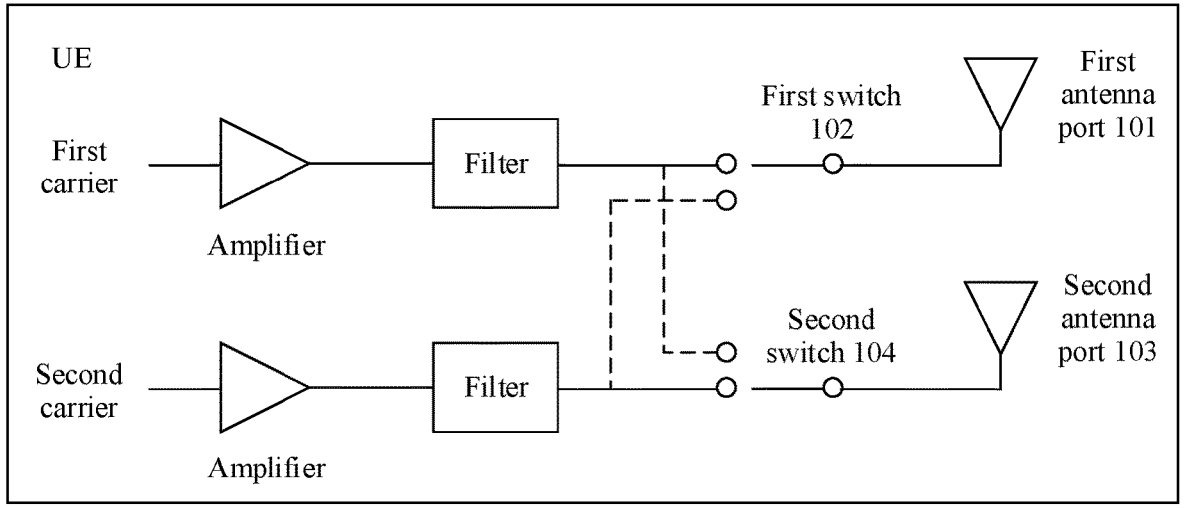
FIG. 1 is a schematic diagram of a structure of UE according to an embodiment of this application.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

In embodiments of this application, a terminal device is a device with a wireless transceiver function, and may be a fixed device, a mobile device, a handheld device (for example, a mobile phone), a wearable device, a vehicle-mounted device, or a wireless apparatus built in the foregoing device (for example, a communication module, a modem, or a chip system). The terminal device is configured to connect people, things, machines, and the like, and the terminal device may be widely used in various scenarios, for example, including but not limited to the following scenarios: cellular communication, device-to-device (D2D) communication, vehicle to everything (V2X), machine-to-machine/machine type communication (M2M/MTC), Internet of things (IoT), virtual reality (VR), augmented reality (AR), industrial control, self driving, remote medical, smart grid, smart furniture, smart office, smart wearables, smart transportation, smart city, unmanned aerial vehicles, and robots. The terminal device may sometimes be referred to as user equipment (UE), a terminal, an access station, a UE station, a remote station, a wireless communication device, a user apparatus, or the like. For ease of description, an example in which the terminal device is UE is used for description in embodiments of this application.

A network device in embodiments of this application includes, for example, an access network device and/or a core network device. The access network device is a device having a wireless transceiver function, and is configured to communicate with the terminal device. The access network device includes but is not limited to a base station (BTS, NodeB, eNodeB/eNB, or gNodeB/gNB) and a transmission reception point (TRP) in the communication system, a base station that subsequently evolves in the 3rd generation partnership project (3GPP), an access node in a wireless fidelity (Wi-Fi) system, a wireless relay node, a wireless backhaul node, or the like. The base station may be a macro base station, a micro base station, a picocell base station, a small cell, a relay station, or the like. A plurality of base stations may support the foregoing networks using a same access technology, or may support the foregoing networks using different access technologies. The base station may include one or more co-site or non-co-site transmission reception points. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. For example, a network device in a vehicle to everything (V2X) technology may be a road side unit (RSU). The following provides descriptions by using an example in which the access network device is a base station. A plurality of network devices in the communication system may be base stations of a same type, or may be base stations of different types. The base station may communicate with a terminal device, or may communicate with a terminal device via a relay station. The terminal device may communicate with a plurality of base stations in different access technologies. The core network device is configured to implement functions such as mobility management, data processing, session management, and policy and charging. Names of devices that implement core network functions in systems of different access technologies may be different. This is not limited in this application. A 5G system is used as an example. The core network device includes an access and mobility management function (AMF), a session management function (SMF), a user plane function (UPF), or the like.

In embodiments of this application, a communication apparatus configured to implement a function of a network device may be the network device, or may be an apparatus, for example, a chip system, that can support the network device to implement the function. The apparatus may be installed in the network device. In the technical solutions provided in embodiments of this application, the technical solutions provided in embodiments of this application are described by using an example in which the apparatus configured to implement the function of the network device is the network device.

An antenna port in embodiments of this application is a logical concept, for example, is virtualized by using a physical antenna deployed on UE. For example, one antenna port may be virtualized by using one or more physical antennas.

In embodiments of this application, unless otherwise specified, a quantity of nouns represents "singular nouns or plural nouns", that is, "one or more". "At least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally represents an "or" relationship between the associated objects. For example, A/B indicates A or B. "At least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In embodiments of this application, ordinal numbers such as "first" and "second" are used to distinguish between a plurality of objects, and not intended to limit sizes, content, a sequence, a time sequence, a priority, or an importance of the plurality of objects. For example, a first antenna port and a second antenna port may be a same antenna port, or may be different antenna ports. In addition, this name does not indicate that the two antenna ports have different locations, priorities, or importance levels.

Each operator has a plurality of spectrums with continuous or discontinuous frequencies. Generally, a corresponding transmit antenna and/or receive antenna are/is configured for UE in each frequency band. The CA technology is to aggregate spectrum resources of a same frequency band or different frequency bands for coordinated transmission, thereby improving spectrum resource utilization. CA may be classified into intra-band CA and inter-band CA. Intra-band CA is to aggregate a plurality of carriers on a same frequency band. In the UE, these carriers on the same frequency band may share a same radio frequency link. Therefore, intra-band CA may increase an uplink capacity compared with single-carrier transmission. Inter-band CA is to aggregate carriers on different frequency bands. In the UE, carriers on different frequency bands usually have separate radio frequency links. Currently, each radio frequency link in the UE can be connected to only one antenna port at most, and antenna port resources of the UE on a plurality of carriers cannot be fully utilized. As a result, uplink transmission performance is limited.

In view of this, the technical solutions in embodiments of this application are provided. In embodiments of this application, a first antenna port included in a terminal device can be switched between radio frequency links associated with at least two frequency domain units. In other words, in embodiments of this application, antenna ports are switched between radio frequency links of different frequency domain units, so that one radio frequency link can be connected to more antenna ports, and a phase difference between a plurality of antenna ports connected to one radio frequency link is adjusted by using a phase shifter. A beamforming gain that can be obtained by each frequency domain unit of the terminal device may be flexibly adjusted, to improve uplink transmission performance. The frequency domain unit in embodiments of this application is, for example, a carrier or a subcarrier, or may be another frequency domain unit. In the following description process, an example in which the frequency domain unit is a carrier is used. In other words, a "carrier" described in the following may be replaced with a "frequency domain unit".

The following first describes a type of UE according to an embodiment of this application with reference to the accompanying drawings.

In this embodiment of this application, the UE may include at least one antenna port and N radio frequency links. The at least one antenna port described in this embodiment of this application may be configured to send one or more types of uplink information, downlink information, or sidelink information. In this embodiment of this application, an example in which the antenna port is used to send the uplink information is mainly used. The at least one antenna port means that one, two, or more antenna ports may be included. A radio frequency link may include a power amplifier (PA), and may further include a filter connected to the power amplifier. The filter is configured to filter another frequency other than a frequency corresponding to the radio frequency link. In addition, the radio frequency link may further include another corresponding component. This is not limited in this embodiment of this application. Hereinafter, a "power amplifier" is referred to as an "amplifier" for short. A radio frequency link and an antenna port connected to the radio frequency link (or referred to as an antenna port corresponding to the radio frequency link) may also be referred to as a transmit channel.

FIG. 1 is a schematic diagram of a structure of the UE. The at least one antenna port may include a first antenna port 101, and the first antenna port 101 may be connected to a first switch 102. The first antenna port 101 can be switched between M radio frequency links in the N radio frequency links by using the first switch 102. Both M and N are integers greater than or equal to 2, and M is less than or equal to N. In addition, the N radio frequency links may be associated with H carriers, and H may be less than or equal to N, or H may be greater than N. To be specific, the first antenna port 101 can be connected to two, three, or more radio frequency links by using the first switch 102. In this case, a network device may schedule, based on different cases (for example, uplink channel quality), the UE to connect the first antenna port 101 to a corresponding radio frequency link to send uplink information of a carrier associated with the radio frequency link. In this way, a quantity of antenna ports that can be supported by each carrier of the UE can be flexibly adjusted, to improve uplink transmission performance.

It may be understood that the first switch 102 may be implemented by using a switch component, or may be implemented by using a functional module. For example, the functional module is referred to as a switch module, a switching module, or a switch switching module. Any functional module or component that can implement switching of the first antenna port 101 between the M radio frequency links in the N radio frequency links may be used as the first switch 102. In an implementation of the first switch 102, for example, the first switch 102 is implemented by using a single-pole multi-throw switch. The single-pole multi-throw switch can be connected to two or more radio frequency links. This is used as an example in FIG. 1. In addition, an example in which the first switch 102 is connected to two radio frequency links is used in FIG. 1. The two radio frequency links are respectively associated with a first carrier and a second carrier.

In addition, in addition to the first antenna port 101, the at least one antenna port may further include one or more other antenna ports. For example, the UE further includes a second antenna port 103, and the second antenna port 103 may not be connected to a switch. In this case, the second antenna port 103 cannot be switched between radio frequency links, but is configured to transmit information about a carrier associated with a radio frequency link connected to the second antenna port 103. In this way, an internal structure of the UE can be simplified, and costs of the UE can be reduced. Alternatively, the second antenna port 103 may be connected to a second switch 104, and the second antenna port 103 can be switched between K radio frequency links in the N radio frequency links by using the second switch 104. K is an integer greater than or equal to 2, and K is less than or equal to N. In other words, one or more antenna ports included in the UE can be connected to a switch, and more radio frequency links can be switched by using the switch, so that information about carriers associated with more radio frequency links can be sent, and flexibility is high. The network device may schedule the UE to send information through an antenna port with a good channel condition, to improve uplink sending performance.

Similarly, the second switch 104 may be implemented by using a switch component, or may be implemented by using a functional module. For example, the functional module is referred to as a switch module, a switching module, or a switch switching module. Any functional module or component that can implement switching of the second antenna port 103 between the K radio frequency links in the N radio frequency links may be used as the second switch 104. All switches that are included in the UE and that are connected to the antenna port may be considered as one functional module. In other words, functions of all the switches that are included in the UE and that are connected to the antenna port may be completed by using the functional module. For example, the first switch 102 and the second switch 104 may be one functional module. Alternatively, the switches that are included in the UE and that are connected to the antenna port may be considered as different functional modules. For example, the first switch 102 and the second switch 104 may be different functional modules.

In an implementation of the second switch 104, for example, the second switch 104 is also implemented by using a single-pole multi-throw switch. The single-pole multi-throw switch can be connected to two or more radio frequency links. This is used as an example in FIG. 1. In addition, an example in which the second switch 104 is connected to two radio frequency links is used in FIG. 1. Radio frequency links that can be switched between different antenna ports by using a switch may be totally different, or may be partially the same, or may be all the same. For example, the first antenna port 101 can be switched between the M radio frequency links by using the first switch 102, and the second antenna port 103 can be switched between the K radio frequency links by using the second switch 104. The M radio frequency links and the K radio frequency links may be same radio frequency links, or the M radio frequency links and the K radio frequency links have an intersection, or the M radio frequency links and the K radio frequency links are different radio frequency links. In addition, M may be equal to K, or may not be equal to K. In other words, a quantity of radio frequency links that can be switched between different antenna ports may be equal, or may not be equal. M=K=2 is used as an example. For example, the M radio frequency links are radio frequency links associated with the first carrier and radio frequency links associated with the second carrier. In this case, the K radio frequency links may also be radio frequency links associated with the first carrier and radio frequency links associated with the second carrier. Alternatively, one of the K radio frequency links may be a radio frequency link associated with the first carrier or a radio frequency link associated with the second carrier, and a remaining radio frequency link in the K radio frequency links is a radio frequency link associated with another carrier. Alternatively, the K radio frequency links do not include a radio frequency link associated with the first carrier, and do not include a radio frequency link associated with the second carrier. In FIG. 1, an example in which K=2 and the two radio frequency links are respectively associated with the first carrier and the second carrier is used. In other words, in FIG. 1, an example in which the M radio frequency links and the K radio frequency links are the same is used. For example, there is an intersection between the M radio frequency links and the K radio frequency links. In other words, one of the radio frequency links can be connected to different antenna ports by using a switch. In this case, information about a carrier associated with the radio frequency link may be sent through a plurality of antenna ports, thereby improving flexibility of sending the information about the carrier.

Certainly, the at least one antenna port may include only the first antenna port 101, or include only the first antenna port 101 and the second antenna port 103. Alternatively, in addition to the first antenna port 101 and the second antenna port 103, the at least one antenna port may further include another antenna port. If another antenna port is included, the included antenna port may be or may not be connected to a switch. An implementation is similar to that of the second antenna port 103. For details, refer to the foregoing description. A quantity of antenna ports included in the UE, whether these antenna ports can be switched between radio frequency links, which radio frequency links these antenna ports can be switched between, and the like may be set based on corresponding factors. These factors include, for example, a performance requirement of the UE, and may further include costs of the UE, a volume of the UE, or the like. This is not limited in this embodiment of this application. In FIG. 1, an example in which the at least one antenna port include the first antenna port 101 and the second antenna port 103, and an example in which the first antenna port 101 and the second antenna port 103 each are connected to a switch are used.

It can be learned from the foregoing description that, in this embodiment of this application, the antenna port can be switched to radio frequency links associated with different carriers by using the switch, so that information on the different carriers can be sent. However, if a phase of the antenna port remains unchanged after the radio frequency links associated with different carriers are switched, sending performance may be poor when the antenna port is used to send information on some carriers. Therefore, optionally, in this embodiment of this application, a phase shifter may be added to the UE, the switch is connected to the phase shifter, and the phase of the antenna port may be adjusted by using the phase shifter, so that when the antenna port is connected to different radio frequency links, the phase is adjusted to improve an uplink beamforming gain. For example, one switch may be connected to one phase shifter, so that a phase of each antenna port can be adjusted. Alternatively, some switches may be connected to the phase shifter, and remaining switches are not connected to the phase shifter, to reduce the volume of the UE and reduce the costs of the UE.

Figure 2:
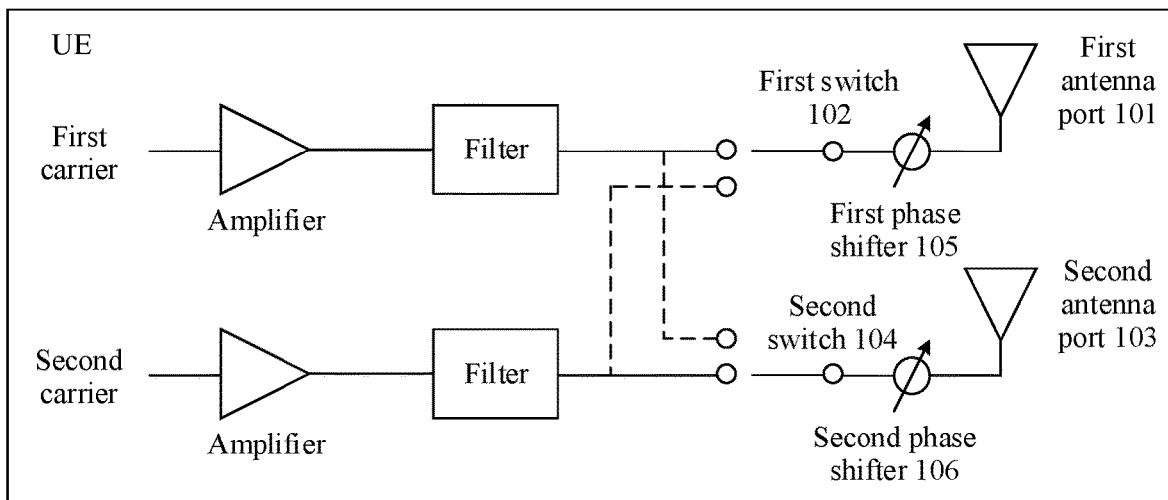
FIG. 2 is a schematic diagram of another structure of UE according to an embodiment of this application.

For example, as shown in FIG. 2, the first switch 102 may be connected to a first phase shifter 105. For example, the first phase shifter 105 may be connected between the first switch 102 and the first antenna port 101, and the first phase shifter 105 may be configured to adjust a phase of the first antenna port 101. For example, if the network device indicates a radio frequency link to which the first switch 102 needs to be connected, the network device may further indicate a phase of the first phase shifter 105. In this way, after connecting the first antenna port 101 to the radio frequency link, the UE may further adjust the phase of the first phase shifter 105, to improve uplink sending performance of the first antenna port 101.

FIG. 1 is used as an example. The UE may further include the second switch 104 connected to the second antenna port 103. In this case, the second switch 104 may be connected to a phase shifter, or may not be connected to a phase shifter. An example in which the second switch 104 is connected to a phase shifter is used. Still refer to FIG. 2. For example, the second switch 104 is connected to a second phase shifter 106. For example, the second phase shifter 106 may be connected between the second switch 104 and the second antenna port 103. The second phase shifter 106 may be configured to adjust a phase of the second antenna port 103. For example, if the network device indicates a radio frequency link to which the second switch 104 needs to be connected, the network device may further indicate a phase of the second phase shifter 106. In this way, after connecting the second antenna port 103 to the radio frequency link, the UE may further adjust the phase of the second phase shifter 106, to improve uplink sending performance of the second antenna port 103. In this embodiment of this application, a phase difference between a plurality of antenna ports connected to one radio frequency link is adjusted by using the phase shifter, so that a beamforming gain that can be obtained by each carrier of the UE can be flexibly adjusted, thereby improving uplink transmission performance.

Figure 3:
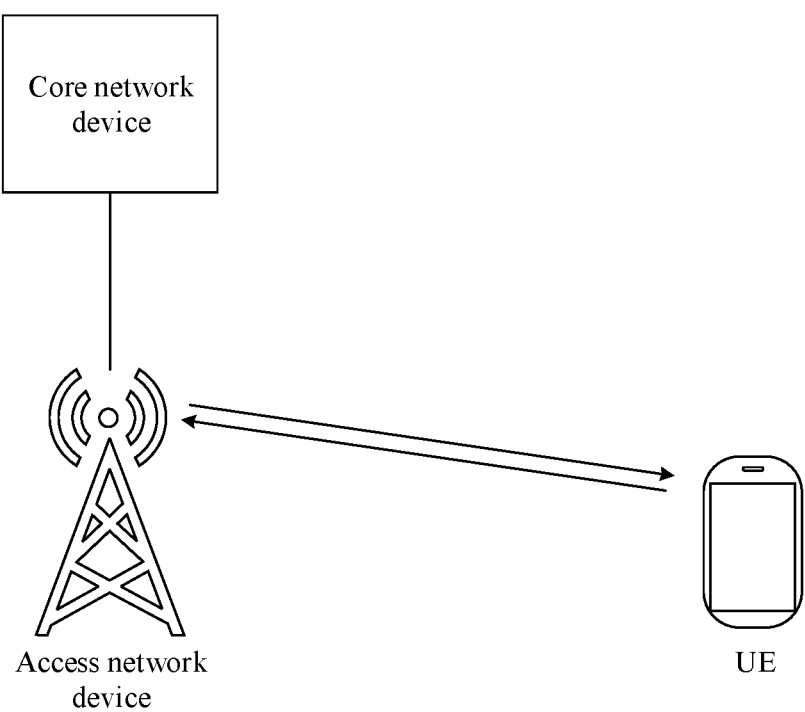
FIG. 3 is a schematic diagram of an application scenario according to an embodiment of this application.

In addition, FIG. 3 is a schematic diagram of an application scenario according to an embodiment of this application. In FIG. 3, an access network device, a core network device, and UE are included. The access network device works, for example, in an evolved universal mobile telecommunications system terrestrial radio access (evolved UMTS terrestrial radio access, E-UTRA) system, or in an NR system, or in a next-generation communication system or another communication system. The access network device is, for example, a base station. The access network device corresponds to different devices in different systems. For example, the access network device may correspond to an eNB in a 4G system, and corresponds to a 5G access network device, for example, a gNB, in a 5G system. Certainly, the technical solutions provided in embodiments of this application may also be applied to a future mobile communication system. Therefore, the access network device in FIG. 3 may also correspond to a network device in the future mobile communication system. In FIG. 3, an example in which the access network device is a base station is used. Actually, with reference to the foregoing descriptions, the access network device may alternatively be a device such as an RSU. In addition, an example in which the UE is a mobile phone is used in FIG. 3. Actually, it can be learned from the foregoing description of the UE that the UE in this embodiment of this application is not limited to the mobile phone.

For ease of description, an example in which embodiments to be described in the following are applied to the architecture shown in FIG. 3 is used. For example, a network device described in the following embodiments is, for example, the access network device in the network architecture shown in FIG. 3, and UE described in the following embodiments may be the UE in the network architecture shown in FIG. 3.

Figure 4:
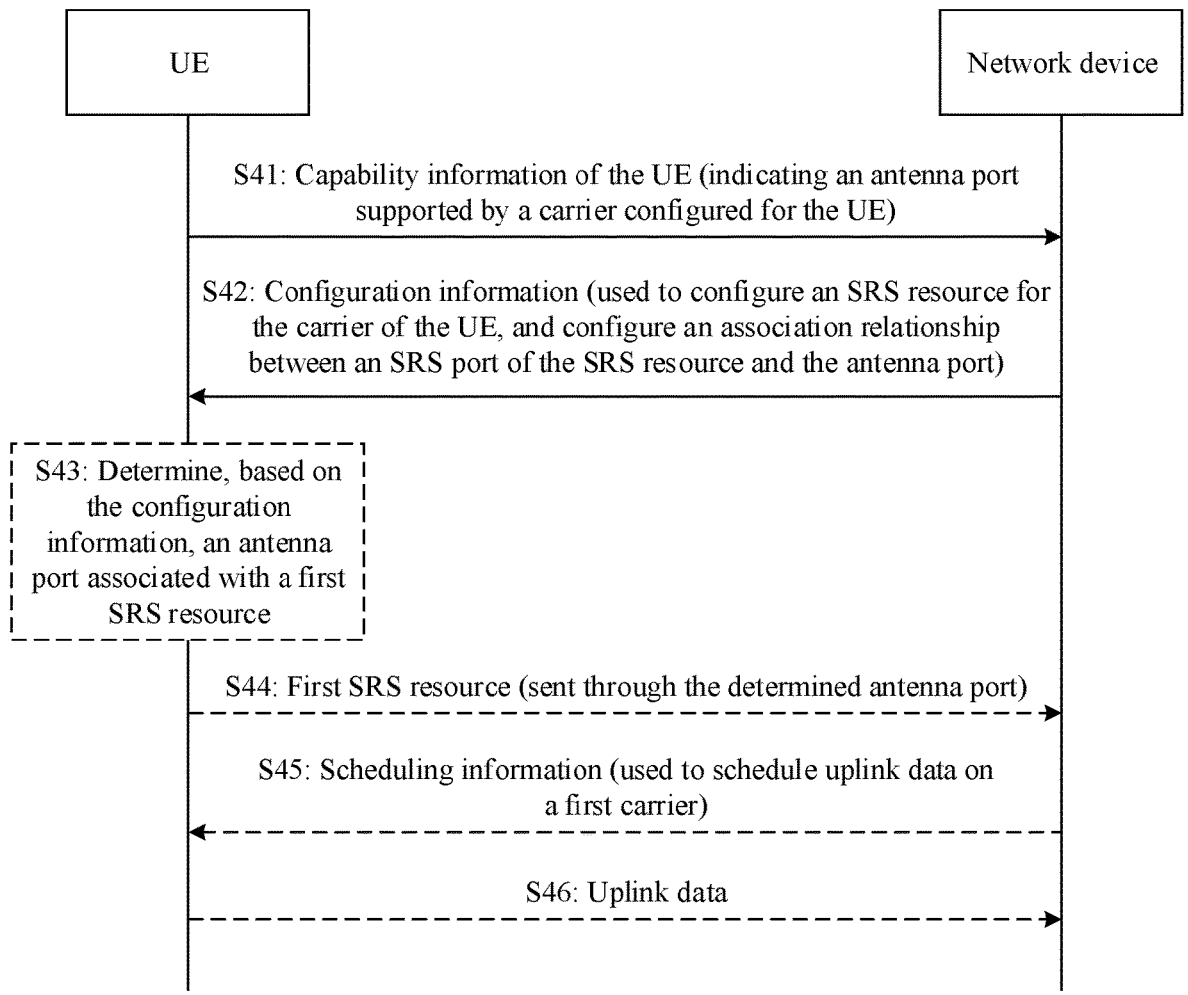
FIG. 4 is a flowchart of a communication method according to an embodiment of this application.

The foregoing describes the UE provided in embodiments of this application and an application scenario of embodiments of this application. The following describes a method provided in embodiments of this application with reference to the accompanying drawings. FIG. 4 is a procedure of a communication method according to an embodiment of this application. The method may be implemented by the UE described in FIG. 1 or FIG. 2.

S41: The UE sends a first message to a network device, and correspondingly, the network device receives the first message from the UE. The first message may include capability information. For example, the first message is a radio resource control (RRC) message, and the RRC message may be sent by the UE to the network device after random access succeeds and before the UE sends uplink data to the network device. Optionally, the RRC message is, for example, a UE capability information message, or may be another RRC message.

The UE may determine capability information of the UE, and send the capability information to the network device. The capability information may indicate an antenna port supported by each of P carriers configured for the UE. The P carriers may include all carriers configured for the UE, or include some carriers configured for the UE, and P is an integer greater than 1. For example, the P carriers include at least two carriers, and the at least two carriers in the P carriers may be associated with respective uplink transmission configuration information. For example, the P carriers include a first carrier, and the first carrier may be associated with first uplink transmission configuration information. It may be understood that uplink transmit channels are configured for the at least two carriers. Configuration information received by the at least two carriers from the network device is referred to as, for example, configuration information A. The configuration information A is used to configure uplink transmission configuration information of the at least two frequency domain units. An antenna port is switched between carriers on which the uplink transmit channels are configured, so that a quantity of antenna ports supported by each carrier can be flexibly adjusted. Further, a phase difference between different antenna ports connected through one radio frequency link is adjusted, to obtain a beamforming gain and improve uplink transmission performance. An antenna port supported by a carrier in this embodiment of this application may include an antenna port associated with the carrier and an antenna port that can be switched to the carrier. The antenna port associated with the carrier is an antenna port that can send information about the carrier without switch switching, or an antenna port that can send information about the carrier without setting a switch between an amplifier and the antenna port. The antenna port that can be switched to the carrier is an antenna port that can send the information about the carrier after switch switching. For example, an antenna port supported by an $i^{th}$ carrier in the P carriers includes an antenna port associated with the $i^{th}$ carrier, and an antenna port that can be switched to the $i^{th}$ carrier in antenna ports associated with $N_i$ carriers. The $N_i$ carriers belong to the P carriers, and the $N_i$ carriers do not include the $i^{th}$ carrier. $N_i$ is an integer greater than or equal to 1 and less than P.

FIG. 1 or FIG. 2 is used as an example. The UE supports two carriers, and the two carriers are respectively the first carrier and a second carrier. For example, the capability information indicates antenna ports supported by all carriers configured for the UE. The UE may determine that antenna ports supported by the first carrier include the first antenna port 101 and the second antenna port 103, and antenna ports supported by the second carrier include the first antenna port 101 and the second antenna port 103. For the first carrier, the first antenna port 101 is an antenna port associated with the first carrier, and the second antenna port 103 is an antenna port that can send information about the first carrier through switching. For the second carrier, the second antenna port 103 is an antenna port associated with the second carrier, and the first antenna port 101 is an antenna port that can send information about the second carrier through switching.

The capability information may indicate an antenna port supported by each carrier of the P carriers in different indication manners. The following provides descriptions by using examples.

1. A first indication manner in which the capability information indicates the antenna port.

The capability information includes information about the antenna port supported by the $i^{th}$ carrier in the P carriers. Information about an antenna port is, for example, a number (or referred to as an index) of the antenna port, or may be an identifier of the antenna port.

The UE may set an index for each antenna port included in the UE. For example, the UE includes the first antenna port 101 and the second antenna port 103. In this case, the UE may set indexes for the first antenna port 101 and the second antenna port 103. For example, the UE may set the indexes for the antenna ports in ascending order of frequencies of carriers, or the UE may set the indexes for the antenna ports in descending order of frequencies of carriers, or the UE may randomly set the indexes, or the like. The UE may indicate a corresponding antenna port by using an index of the antenna port. For example, the UE may add the index of the antenna port supported by each carrier of the P carriers to the capability information and send the capability information to the network device, so that the network device can determine, based on the capability information, the antenna port supported by each carrier.

For example, for the $i^{th}$ carrier in the P carriers, the capability information may include an index $x_i$ of the antenna port supported by the $i^{th}$ carrier in the P carriers. $x_i$ is an integer greater than or equal to 1 and less than or equal to $N_t$, or $x_i$ is a nonnegative integer less than $N_t$. $N_t$ is a total quantity of antenna ports associated with the P carriers. i is an integer greater than or equal to 1 and less than or equal to P. It may be understood that the $i^{th}$ carrier is any one of the P carriers. FIG. 1 or FIG. 2 is used as an example. For example, if an index of the first antenna port 103 is 0, and an index of the second antenna port 103 is 1, indexes that are of the antenna ports supported by the first carrier and that are included in the capability information are 0 and 1, and a total quantity of antenna ports associated with the first carrier and the second carrier is 2. Both 0 and 1 are less than 2.

Figure 5:
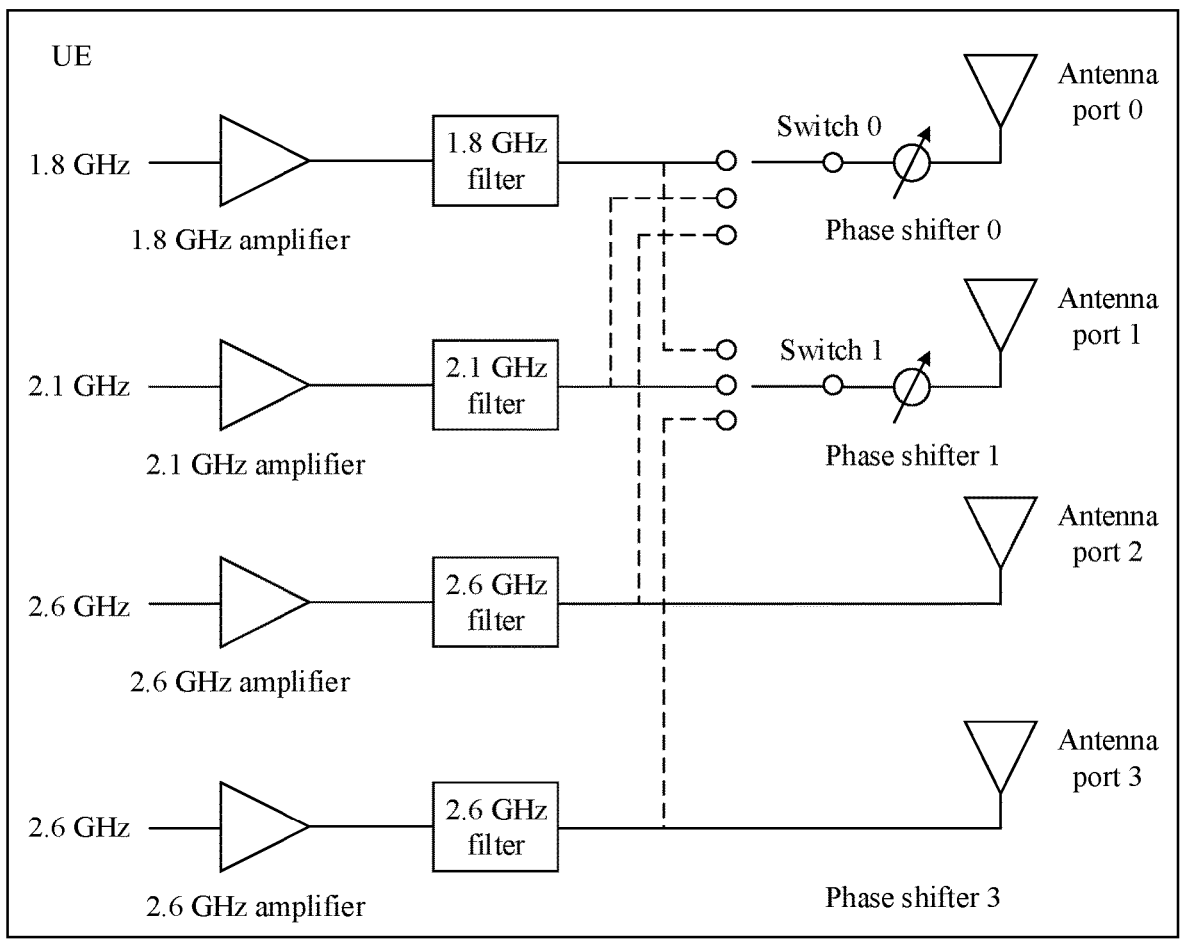
FIG. 5 is a schematic diagram of another structure of UE according to an embodiment of this application.

For ease of understanding, the following provides a specific example of a structure of the UE. Refer to FIG. 5. The structure of the UE shown in FIG. 5 is an example of the structure of the UE shown in FIG. 2. In FIG. 5, an example in which the UE supports a 1.8 GHz carrier, a 2.1 GHz carrier, and a 2.6 GHz carrier is used. In actual application, the UE may support more or less carriers, and frequencies of the carriers supported by the UE may also be different. The 1.8 GHz carrier is associated with a radio frequency link 0, the 2.1 GHz carrier is associated with a radio frequency link 1, and the 2.6 GHz carrier is associated with a radio frequency link 2 and a radio frequency link 3. The radio frequency link 0, the radio frequency link 1, the radio frequency link 2, and the radio frequency link 3 each are connected to one antenna port. In other words, the four radio frequency links are connected to four antenna ports. In other words, in FIG. 5, an example in which the UE supports four antenna ports is used. The radio frequency link 0 is a radio frequency link including an amplifier 0, the radio frequency link 1 is a radio frequency link including an amplifier 1, the radio frequency link 2 is a radio frequency link including an amplifier 2, and the radio frequency link 3 is a radio frequency link including an amplifier 3. The radio frequency link 0 includes the amplifier 0 and a 1.8 GHz filter, the radio frequency link 1 includes the amplifier 1 and a 2.1 GHz filter, the radio frequency link 2 includes the amplifier 2 and a 2.6 GHz filter, and the radio frequency link 3 includes the amplifier 3 and a 2.6 GHz filter 3. The 1.8 GHz filter is a filter that can filter out frequencies other than 1.8 GHz, the 2.1 GHz filter is a filter that can filter out frequencies other than 2.1 GHz, and the 2.6 GHz filter is a filter that can filter out frequencies other than 2.6 GHz.

The UE may number the four antenna ports. For example, the UE may number the antenna ports in ascending order of frequencies of the carriers, or the UE may number the antenna ports in descending order of frequencies of the carriers, or the UE may randomly number the antenna ports. For example, the UE numbers the antenna ports in ascending order of the frequencies of the carriers. For example, the UE may number an antenna port associated with the 1.8 GHz carrier in the four antenna ports as 0 (which may be referred to as an antenna port 0), number an antenna port associated with the 2.1 GHz carrier as 1 (which may be referred to as an antenna port 1), and respectively number antenna ports associated with the 2.6 GHz carrier as 2 and 3 (which may be referred to as an antenna port 2 and an antenna port 3 respectively). In addition, in FIG. 5, an example in which the antenna port 0 is connected to a switch, the antenna port 1 is connected to a switch, and neither the antenna port 2 nor the antenna port 3 is connected to a switch is used. For example, the switch connected to the antenna port 0 is referred to as a switch 0, and the switch connected to the antenna port 1 is referred to as a switch 1. For example, in FIG. 5, the 1.8 GHz carrier is associated with the antenna port 0, the 2.1 GHz carrier is associated with the antenna port 1, and the 2.6 GHz carrier is associated with the antenna port 2 and the antenna port 3. In addition, the antenna port 0 may further be switched to the radio frequency link associated with the 2.1 GHz carrier (or switched to the 2.1 GHz carrier, where the following is similar) or switched to the radio frequency link associated with the 2.6 GHz carrier by switching the switch 0. The antenna port 1 may be switched to the radio frequency link associated with the 1.8 GHz carrier or switched to the radio frequency link associated with the 2.6 GHz carrier by switching the switch 1. Both the antenna port 2 and the antenna port 3 are connected to the radio frequency links associated with the 2.6 GHz carrier, and switching cannot be performed. In addition, in FIG. 5, the switch 0 is connected to a phase shifter 0, and the switch 1 is connected to a phase shifter 1. The phase shifter 0 may be configured to adjust a phase of the antenna port 0, and the phase shifter 1 may be configured to adjust a phase of the antenna port 1. Because the antenna port 2 and the antenna port 3 are not connected to a switch, no phase shifter is disposed.

For example, for the 1.8 GHz carrier in FIG. 5, an antenna port associated with the carrier includes the antenna port 0, and an antenna port that can be switched to the carrier includes the antenna port 1. For the 2.1 GHz carrier, an antenna port associated with the carrier includes the antenna port 1, and an antenna port that can be switched to the carrier includes the antenna port 0. For the 2.6 GHz carrier, antenna ports associated with the carrier include the antenna port 2 and the antenna port 3, and antenna ports that can be switched to the carrier include the antenna port 0 and the antenna port 1. It may be understood that a connection relationship between an antenna port and a radio frequency link that is shown by using a dotted line in FIG. 5 indicates a connection relationship that needs to be implemented by switching a switch, and a connection relationship between an antenna port and a radio frequency link that is shown by using a solid line indicates a connection relationship that can be implemented without setting a switch.

FIG. 5 is still used as an example. If the capability information indicates the antenna port supported by each carrier in all the carriers configured for the UE, the capability information determined by the UE may indicate that antenna ports supported by the 1.8 GHz carrier include the antenna port 0 and the antenna port 1, antenna ports supported by the 2.1 GHz carrier include the antenna port 0 and the antenna port 1, and antenna ports supported by the 2.6 GHz carrier include the antenna port 0, the antenna port 1, the antenna port 2, and the antenna port 3. For example, an antenna port supported by a carrier may be included in the capability information in a form of a set. In this case, the capability information may include a set of antenna ports that can be supported by the 1.8 GHz carrier {the antenna port 0, the antenna port 1}, a set of antenna ports that can be supported by the 2.1 GHz carrier {the antenna port 0, the antenna port 1}, and a set of antenna ports that can be supported by the 2.6 GHz carrier {the antenna port 0, the antenna port 1, the antenna port 2, the antenna port 3}.

In this implementation, the capability information is clearer, thereby helping the network device more clearly determine the capability information of the UE.

For example, the first message is a UE capability information message, and the UE capability information message may include a bandwidth combination list information element (BandCombinationList information element) field. The bandwidth combination list information element field is originally used to carry a carrier aggregation bandwidth combination supported by the UE and/or a multi-radio access technology dual connectivity (multi-RAT dual connectivity, MR-DC) bandwidth combination supported by the UE. The bandwidth combination list information element field may include a bandwidth parameter field. For example, the first implementation is used for the capability information. In this embodiment of this application, the capability information may be carried in the bandwidth parameter field. For example, a structure in which the capability information is carried by using the bandwidth parameter field is as follows:

```
BandParameters-vxxxx::=        SEQUENCE{
...
AntCarrierSwitch
}
```

BandParameters-vxxxx represents the bandwidth parameter field included in the bandwidth combination list information element field, and antenna carrier switching represents the capability information provided in this embodiment of this application. Certainly, the capability information provided in this embodiment of this application may have another name, and AntCarrierSwitch is merely an example.

2. A second manner in which the capability information indicates the antenna port.

The capability information may indicate a total quantity of antenna ports of the UE. For example, the total quantity of antenna ports of the UE is $N_t$. The $N_t$ antenna ports are, for example, the antenna ports associated with the P carriers configured for the UE. FIG. 5 is used as an example. If the 1.8 GHz carrier is associated with the antenna port 0, the 2.1 GHz carrier is associated with the antenna port 1, and the 2.6 GHz carrier is associated with the antenna port 2 and the antenna port 3, $N_t$ is 4. In this case, the capability information indicates that the total quantity of antenna ports of the UE is 4.

If the capability information provides an indication in this manner, the network device may not be able to determine which carrier is associated with which antenna ports. However, this indication manner is simple, and an information amount is also small. This helps reduce signaling overheads.

3. A third manner in which the capability information indicates the antenna port.

The capability information may indicate a quantity of antenna ports associated with the $i^{th}$ carrier in the P carriers. For example, the quantity is $M_i$. $M_i$ is an integer greater than or equal to 1, and $M_i$ is less than or equal to the total quantity of antenna ports associated with the P carriers. For example, the capability information may indicate a quantity of antenna ports associated with each carrier in the P carriers, and the quantity of antenna ports associated with the $i^{th}$ carrier is $M_i$. Alternatively, the capability information may indicate a quantity of antenna ports associated with each of some carriers in the P carriers, and the quantity of antenna ports associated with the $i^{th}$ carrier is $M_i$. Quantities of antenna ports associated with different carriers in the P carriers may be the same or different.

In addition, the first message may further include first information. The first information may indicate information that $M_i$ antenna ports associated with the $i^{th}$ carrier can be switched to a $j^{th}$ carrier, j is not equal to i, and both i and j are integers greater than or equal to 1 and less than or equal to P. The first information may be included in the first message, but is not the capability information, or the first information may be the capability information. Herein, an example in which the first information is the capability information is used. For example, the first information may indicate switching information of each of the P carriers. Herein, an example in which the first information indicates switching information of the $i^{th}$ carrier is used. A switching relationship between an antenna port and a carrier may be indicated by using an indication of the capability information. In addition, the quantity of antenna ports associated with the $i^{th}$ carrier in the P carriers may be originally included in the capability information. In other words, even if the structure of the UE provided in this embodiment of this application is not used, the UE may still need to send the capability information to the network device. In this case, the quantity of antenna ports associated with the carriers configured for the UE is originally included in the capability information. The first information may be extended content in the capability information in this embodiment of this application. This is equivalent to that, in this manner, existing information in the capability information may be used, and corresponding information (for example, the first information) may be added to the capability information, to indicate the antenna ports supported by the P carriers configured for the UE in this embodiment of this application, thereby improving utilization of the original information of the capability information. For example, a numbering rule of the antenna ports is specified in a protocol. For example, the protocol specifies that indexes are set for the antenna ports in ascending order of frequencies of carriers, or the protocol specifies that indexes are set for the antenna ports in descending order of frequencies of carriers. In this way, both the UE and the network device can determine the numbering rule. Therefore, the network device can determine a relationship between an index and an antenna port.

The first information may indicate, in different indication manners, the information that the $M_i$ antenna ports can be switched to the $j^{th}$ carrier. The following provides descriptions by using examples.

In an optional implementation in which the first information indicates the information that the $M_i$ antenna ports can be switched to the $j^{th}$ carrier, the first information may indicate a quantity of antenna ports that can be switched to the $j^{th}$ carrier in the $M_i$ antenna ports. For example, as shown in FIG. 5, the 1.8 GHz carrier is associated with the antenna port 0, a quantity of antenna ports that can be switched to the 2.1 GHz carrier is 1, and a quantity of antenna ports that can be switched to the 2.6 GHz carrier is 1. The 2.1 GHz carrier is associated with the antenna port 1, a quantity of antenna ports that can be switched to the 1.8 GHz carrier is 1, and a quantity of antenna ports that can be switched to the 2.6 GHz carrier is 1. The 2.6 GHz carrier is associated with the antenna port 0 and the antenna port 1, a quantity of antenna ports that can be switched to the 1.8 GHz carrier is 0, and a quantity of antenna ports that can be switched to the 2.1 GHz carrier is 0. In this indication manner, only a quantity of antenna ports needs to be indicated. An indication is simple, and signaling overheads are low.

In another optional implementation in which the first information indicates the information that the $M_i$ antenna ports can be switched to the $j^{th}$ carrier, the first information may indicate that an $m^{th}$ antenna port in the $M_i$ antenna ports can be switched to the $j^{th}$ carrier, where $m=1, 2, \ldots,$ or $M_i$, or $m=0, 1, \ldots,$ or $M_i-1$. For example, as shown in FIG. 5, for the 1.8 GHz carrier, the first information may indicate that the antenna port 0 can be switched to the 2.1 GHz carrier (in other words, switched to the radio frequency link 1 associated with the 2.1 GHz carrier), and may further indicate that the antenna port 0 can be switched to the 2.6 GHz carrier (in other words, switched to the radio frequency link 2 associated with the 2.6 GHz carrier). In this indication manner, the network device can determine a switching relationship between an antenna port and the $j^{th}$ carrier, so that the indication is clearer.

For example, the first information may include a first set and a second set. The first set includes information about at least one carrier, and the second set includes information about at least one carrier. A quantity of carriers corresponding to the carrier information included in the first set may be less than or equal to P, and a quantity of carriers corresponding to the carrier information included in the second set may be less than or equal to P. An antenna port associated with information that is about an $r^{th}$ carrier and that is included in the second set can be switched to the $r^{th}$ carrier included in the first set, where r is an integer greater than or equal to 0, and r is less than or equal to P.

For example, refer to FIG. 5. It is assumed that before the antenna ports are switched, or before a switch is set for the antenna ports, numbering is performed according to a predefined rule of ascending order of the frequencies of the carriers. The 1.8 GHz carrier is associated with one antenna port, and the antenna port is the antenna port 0. The 2.1 GHz carrier is associated with one antenna port, and the antenna port is the antenna port 1. The 2.6 GHz carrier is associated with two antenna ports, and the two antenna ports are the antenna port 2 and the antenna port 3. For example, the P carriers include the 1.8 GHz carrier, the 2.1 GHz carrier, and the 2.6 GHz carrier, and the quantity of antenna ports associated with the P carriers that is included in the capability information may include that a quantity of antenna ports associated with the 1.8 GHz carrier is 1, a quantity of antenna ports associated with the 2.1 GHz carrier is 1, and a quantity of antenna ports associated with the 2.6 GHz carrier is 2. In addition, the capability information further includes a first set and a second set. For example, the first set is {1.8 GHz, 2.1 GHz, 2.6 GHz, 2.6 GHz}, and the second set is {2.1 GHz, 1.8 GHz, 1.8 GHz, 2.1 GHz}, indicating that the antenna port associated with the 2.1 GHz carrier can be switched to the 1.8 GHz carrier, the antenna port associated with the 1.8 GHz carrier can be switched to the 2.1 GHz carrier, the antenna port associated with the 1.8 GHz carrier can be switched to the 2.6 GHz carrier, and the antenna port associated with the 2.1 GHz carrier can be switched to the 2.6 GHz carrier.

It can be learned from FIG. 1, FIG. 2, or FIG. 5 that some carriers may be associated with a plurality of radio frequency links. For example, the first set and the second set indicate that the antenna port associated with the 1.8 GHz carrier can be switched to the 2.6 GHz carrier, and the antenna port associated with the 2.1 GHz carrier can also be switched to the 2.6 GHz carrier. However, the 2.6 GHz carrier is associated with the radio frequency link 2 and the radio frequency link 3. In this case, the network device may not determine a radio frequency link that is associated with the 2.6 GHz carrier and to which the antenna port associated with the 1.8 GHz carrier is switched, and may not determine a radio frequency link the is associated with the 2.6 GHz carrier and to which the antenna port associated with the 2.1 GHz carrier is switched. For another example, the first set and the second set indicate that the antenna port associated with the 2.6 GHz carrier can be switched to the 1.8 GHz carrier. In this case, the network device may not determine which antenna port associated with the 2.6 GHz carrier that can be switched to the 1.8 GHz carrier. Therefore, optionally, the first message may further include switching information, and the switching information may indicate a switching relationship between antenna ports associated with one or more carriers indicated by the second set and radio frequency links associated with the carriers included in the first set.

FIG. 5 is still used as an example. For example, the first set includes information about the 2.6 GHz carrier, and the 2.6 GHz carrier is associated with the radio frequency link 2 and the radio frequency link 3. In this case, the switching information may indicate which of the two radio frequency links the antenna port associated with the 1.8 GHz carrier included in the second set is switched to, or may indicate which of the two radio frequency links the antenna port associated with the 2.1 GHz carrier included in the second set is switched to. For example, the switching information is {a, b}, where a and b respectively indicate the radio frequency link 2 and the radio frequency link 3. In ascending order of the frequencies of the carriers, a indicates switching information of the antenna port associated with the 1.8 GHz carrier, that is, which of the two antenna ports the antenna port associated with the 1.8 GHz carrier is switched to, and b indicates switching information of the antenna port associated with the 2.1 GHz carrier, that is, which of the two antenna ports the antenna port connected to the radio frequency link associated with the 2.1 GHz carrier is switched to. For example, the switching information being {10, 01} indicates that the antenna port associated with the 1.8 GHz carrier is switched to the antenna port 2, and the antenna port associated with the 2.1 GHz carrier is switched to the antenna port 3. Alternatively, the switching information may be implemented in a form of a bitmap. For example, the first information includes 2 bits. A high-order bit in the 2 bits indicates switching information of the antenna port associated with the 1.8 GHz carrier, and a low-order bit indicates switching information of the antenna port associated with the 2.1 GHz carrier. A value of a bit being "0" indicates the antenna port 2, and a value of the bit being "1" indicates the antenna port 3. For example, the switching information being {0, 1} indicates that the antenna port associated with the 1.8 GHz carrier is switched to the antenna port 2, and the antenna port associated with the 2.1 GHz carrier is switched to the antenna port 3.

For another example, the first message is a UE capability information message, and the UE capability information message includes an uplink transmit switching bandwidth pair (ULTxSwitchingBandPair) field. The uplink transmit switching bandwidth pair field includes information about the antenna ports associated with the carriers configured for the UE. For example, the third implementation is used for the capability information. In this embodiment of this application, the first set and the second set are added to the uplink transmit switching bandwidth pair field. Optionally, if the capability information further includes the switching information, the switching information may also be included in the uplink transmit switching bandwidth pair field. For example, a structure in which the capability information is carried by using the uplink transmit switching bandwidth pair field is as follows:

```
ULTxSwitchingBandPair-rx ::=         SEQUENCE {
    bandIndexUL1,
    bandIndexUL2,
    AntIndexUL
}
```

A bandwidth index uplink 1 (bandIndexUL1) represents the first set, a bandwidth index uplink 2 (bandIndexUL2) represents the second set, and an antenna index uplink (AntIndexUL) represents the switching information.

Certainly, regardless of which of the implementations is used for the capability information, the capability information may alternatively be included in another message other than the UE capability information message. Even if the capability information is included in the UE capability information message, the capability information may alternatively be carried by using another field. For example, the capability information may be carried by using a newly added field in the UE capability information message. In addition, in addition to indicating the antenna ports supported by the P carriers, the capability information may further indicate another capability of the UE. This is not limited in this embodiment of this application.

S42: The network device sends configuration information to the UE, and correspondingly, the UE receives the configuration information from the network device.

The configuration information may be used to configure a sounding reference signal (SRS) resource for the carrier of the UE. Optionally, the configuration information may be further used to configure an association relationship between an SRS port of the SRS resource and an antenna port of the UE. For example, the configuration information may be used to configure an SRS resource for each of the P carriers of the UE. The P carriers may be all or some carriers configured for the UE, and the configuration information may be used to configure an association relationship between an SRS port of each configured SRS resource and an antenna port of the UE. The configuration information is that one or more SRS resources may be configured for one carrier, and one SRS resource may correspond to one or more SRS ports. For example, the first carrier is a carrier configured for the UE.

The configuration information may be used to configure at least two SRS resources for the first carrier, and may be used to configure an association relationship between SRS ports of the at least two SRS resources and the antenna ports supported by the first carrier. That one SRS port of one SRS resource is associated with one antenna port may be understood as that an SRS corresponding to the SRS port is sent through the antenna port. For one of the at least two SRS resources of the first carrier, a quantity of SRS ports of the SRS resource may be a positive integer less than or equal to a quantity of antenna ports associated with the first carrier.

In addition, SRS ports of different SRS resources configured for one carrier may be associated with different antenna ports. For example, an SRS resource A and an SRS resource B are configured for the first carrier, the SRS resource A corresponds to an SRS port a, and the SRS resource B corresponds to an SRS port b. In this case, an antenna port associated with the SRS port a and an antenna port associated with the SRS port b may be different antenna ports. This is because a quantity of SRS ports of an SRS resource configured for a carrier may be less than or equal to a quantity of antenna ports associated with the carrier. Therefore, to measure the quantity of antenna ports supported by the UE (where the quantity of antenna ports supported by the UE may be greater than or equal to the quantity of antenna ports associated with the carrier), a plurality of SRS resources need to be configured for the carrier, to measure uplink channels corresponding to different antenna ports.

For example, a first SRS resource and a second SRS resource are configured by using the configuration information. Time units occupied by the first SRS resource and the second SRS resource may be the same or different. If the time units occupied by the first SRS resource and the second SRS resource are different, the first SRS resource and the second SRS resource may be associated with different antenna ports. For example, the configuration information is used to configure the first SRS resource and the second SRS resource for the first carrier. Alternatively, if the time units occupied by the first SRS resource and the second SRS resource are different, the first SRS resource and the second SRS resource may be associated with a same antenna port. For example, the configuration information is used to configure the first SRS resource for the first carrier and the second SRS resource for the second carrier. If the time units occupied by the first SRS resource and the second SRS are the same, the first SRS resource and the second SRS resource are not associated with a same antenna port. In this case, the configuration information may be used to configure the two SRS resources to be associated with different antenna ports. For example, the configuration information is used to configure the first SRS resource for the first carrier, and configure the second SRS resource for the second carrier. In other words, for a same antenna port, at a moment, information is sent only on one carrier, and information cannot be sent on different carriers.

Figure 6:
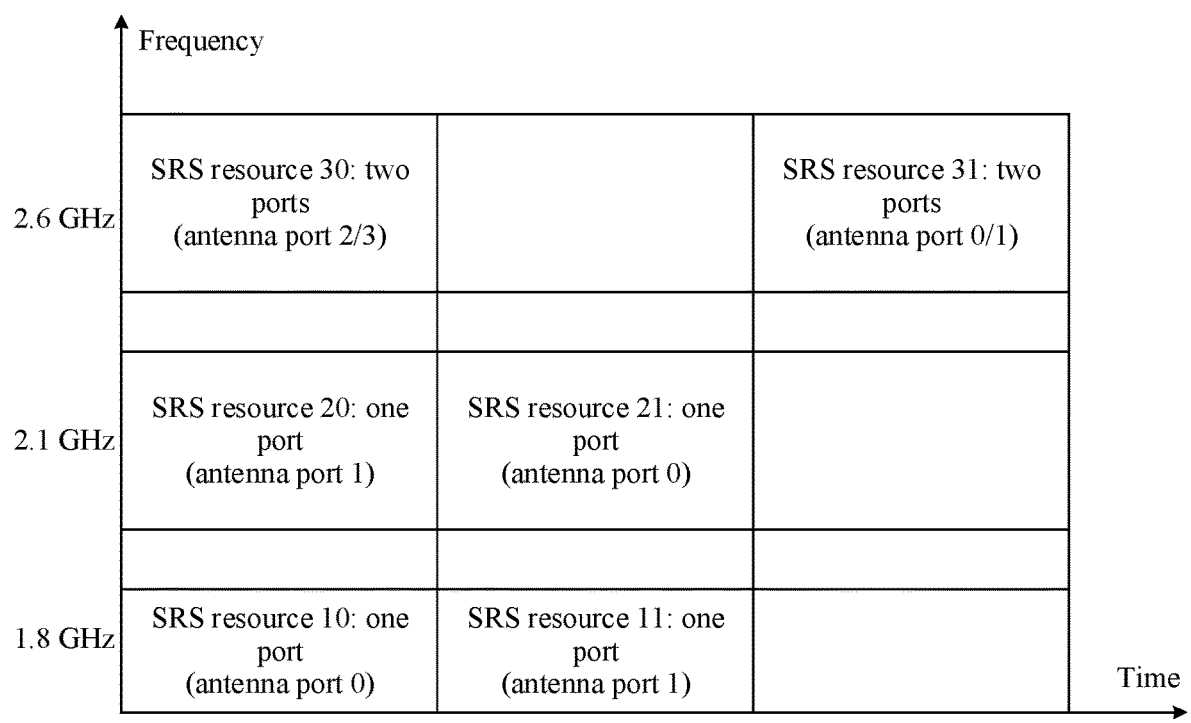
FIG. 6 is a schematic diagram of content indicated by configuration information according to an embodiment of this application.

For example, based on the UE shown in FIG. 5, for a configuration of the configuration information, refer to FIG. 6. In FIG. 6, the network device configures an SRS resource 30 and an SRS resource 31 for the 2.6 GHz carrier, and configures two SRS ports of the SRS resource 30 to be respectively associated with the antenna port 2 and the antenna port 3 in FIG. 5 and two ports of the SRS resource 31 to be respectively associated with the antenna port 0 and the antenna port 1 in FIG. 5; configures an SRS resource 20 and an SRS resource 21 for the 2.1 GHz carrier, and configures one SRS port of the SRS resource 20 to be associated with the antenna port 1 in FIG. 5 and one SRS port of the SRS resource 21 to be associated with the antenna port 0 in FIG. 5; and configures an SRS resource 10 and an SRS resource 11 for the 1.8 GHz carrier, and configures one SRS port of the SRS resource 10 to be associated with the antenna port 0 in FIG. 5 and one SRS port of the SRS resource 11 to be associated with the antenna port 1 in FIG. 5.

In a possible implementation, if a plurality of SRS resources are configured for one carrier, antenna ports corresponding to same SRS ports of different SRS resources of the carrier may be connected to a same radio frequency link. For example, for an association relationship between the SRS ports of the plurality of SRS resources and the antenna ports of the UE shown in FIG. 6, refer to Table 1.

TABLE 1

| SRS resource | SRS port | Antenna port |
|---|---|---|
| 10 | 0 | 0 |
| 11 | 0 | 1 |
| 20 | 0 | 1 |
| 21 | 0 | 0 |
| 30 | 0 | 2 |
|  | 1 | 3 |
| 31 | 0 | 0 |
|  | 1 | 1 |

It can be learned from Table 1 and FIG. 5 that, because the 2.6 GHz carrier is associated with two radio frequency links and configured with two 2-port SRS resources, namely, the SRS resource 30 and the SRS resource 31, the antenna port 0 and the antenna port 2 in FIG. 5 may be connected to a same radio frequency link, and the antenna port 1 and the antenna port 3 in FIG. 5 may be connected to a same radio frequency link. In this case, the network device may configure the SRS port 0 of the SRS resource 30 to be associated with the antenna port 2 in FIG. 5, the antenna port 0 of the SRS resource 31 to be associated with the antenna port 0 in FIG. 5, the SRS port 1 of the SRS resource 30 to be associated with the antenna port 3 in FIG. 5, and the SRS port 1 of the SRS resource 31 to be associated with the antenna port 1 in FIG. 5.

After receiving the configuration information, the UE may not need to perform additional determining, but perform an operation based on the configuration information. Alternatively, after receiving the configuration information, the UE may determine, with reference to an actual situation of the UE and the configuration information, the association relationship between an SRS port of the SRS resource of the carrier configured for the UE and an antenna port of the UE. In other words, the configuration information is used as reference information for the UE, and the UE may determine, with reference to the actual situation of the UE, whether to perform an operation based on the configuration information completely. In this embodiment of this application, an example in which the UE performs the operation based on the configuration information is used.

The network device may send the configuration information to UE only once, and does not change the configuration information after sending. For example, the network device sends the configuration information to the UE after the UE succeeds in random access, and does not change the configuration information after sending. Alternatively, the network device may update the configuration information. For example, when a first condition is met, the network device may send new configuration information to the UE. The new configuration information is still used to configure an SRS resource for the carrier of the UE, and the configuration information may be further used to configure an association relationship between an SRS port of the SRS resource and an antenna port of the UE. For ease of differentiation, original configuration information is referred to as first configuration information, and the new configuration information is referred to as second configuration information. A carrier configured by using the second configuration information and a carrier configured by using the first configuration information may be completely the same. For example, both the first configuration information and the second configuration information are used to configure the 1.8 GHz carrier and the 2.1 GHz carrier. Alternatively, a carrier configured by using the second configuration information and a carrier configured by using the first configuration information may have an intersection but are not completely the same. For example, the first configuration information is used to configure the 1.8 GHz carrier and the 2.1 GHz carrier, and the second configuration information is used to configure the 1.8 GHz carrier and the 2.6 GHz carrier. Alternatively, the first configuration information is used to configure the 1.8 GHz carrier and the 2.1 GHz carrier, and the second configuration information is used to configure the 1.8 GHz carrier, the 2.1 GHz carrier, and the 2.6 GHz carrier. Alternatively, a carrier configured by using the second configuration information and a carrier configured by using the first configuration information may be completely different. For example, the first configuration information is used to configure the 1.8 GHz carrier and the 2.1 GHz carrier, and the second configuration information is used to configure the 2.6 GHz carrier. Similarly, even if both the second configuration information and the first configuration information are used to configure a same carrier, an SRS resource configured for the carrier by using the first configuration information and an SRS resource configured for the carrier by using the second configuration information may be completely the same, or may have an intersection but are not completely the same, or may be completely different. Even if the second configuration information and the first configuration information are used to configure a same SRS resource for a same carrier, an association relationship that is between an SRS port of the SRS resource and an antenna port of the UE and that is configured by using the first configuration information and an association relationship that is between the SRS port of the SRS resource and an antenna port of the UE and that is configured by using the second configuration information may be completely the same, or may have an intersection but are not completely the same, or may be completely different. In other words, the first configuration information and the second configuration information may be completely the same, or may have an intersection but are not completely the same, or may be completely different.

The first condition may include one or more of the following: A period is reached; uplink channel quality of the UE is lower than a first threshold; duration between start time and current time reaches first duration, where time at which the first configuration information is sent is used as the start time; the UE is handed over to a new cell; a value of a first parameter of the UE changes; a change amount of a value of a first parameter of the UE is greater than a first threshold; or trigger information from the UE is received, where the trigger information indicates to reconfigure an SRS resource, or indicates to reconfigure an association relationship between an SRS port of an SRS resource and an antenna port of the UE. For example, the first condition includes that the uplink channel quality of the UE is lower than the first threshold, and includes that the duration between the time at which the first configuration information is sent and the current time reaches the first duration. For another example, the first condition includes that the UE is handed over to the new cell. For another example, the first condition includes that the trigger information from the UE is received. For another example, the first condition includes that the uplink channel quality of the UE is lower than the first threshold, the period is reached, the duration between the time at which the first configuration information is sent and the current time reaches the first duration, the UE is handed over to the new cell, the trigger information from the UE is received, and the like.

The first condition being that the period is reached means that the network device may periodically send the configuration information to the UE. In this manner, the configuration information may be periodically updated to meet a current channel condition.

The uplink channel quality of the UE may be quality of any uplink channel of the UE, or average quality of all or some uplink channels of the UE. If the uplink channel quality of the UE is lower than the first threshold, transmission of uplink data scheduled by the network device based on the first configuration information may be affected. Therefore, the network device may perform reconfiguration.

If the first configuration information is sent to the UE for a long time, an uplink channel condition and the like may change in this time period, and transmission of the uplink data scheduled by the network device based on the first configuration information may be affected. Therefore, the network device may update the configuration information to be applicable to a current channel condition.

If the UE is handed over to the new cell, the first configuration information sent by an original cell to the UE may no longer be applicable to the new cell. Therefore, the new cell may send the second configuration information to the UE.

The first parameter may include any one or more parameters of the UE, for example, a power consumption parameter or a heating parameter. For example, if the UE heats seriously, it may indicate that a relationship configured by using the first configuration information is not applicable to an actual situation of the UE. In this case, after learning that the UE heats seriously, the network device may update the configuration information.

The UE may alternatively determine whether to update the configuration information. For example, if the UE determines that an uplink channel condition is poor, or the value of the first parameter of the UE changes, or the change amount of the value of the first parameter of the UE is greater than the first threshold (for example, the UE heats seriously), the UE may send the trigger information to the network device, to trigger the network device to update the configuration information. This enhances initiative of the UE.

In addition to the conditions, the first condition may further include another condition. This is not limited in this embodiment of this application.

Alternatively, the configuration information may be used to configure an SRS resource for the carrier of the UE, but the configuration information may not be used to configure an association relationship between an SRS port of the SRS resource and an antenna port of the UE. The association relationship may be determined according to a predefined rule.

For example, for a carrier, the network device may first determine which antenna ports are originally associated with the carrier and which antenna ports are switched to the carrier by using a switch. Then, the network device may infer, according to the predefined rule, antenna ports that can be connected to a same radio frequency link. Then, the network device may determine, according to the predefined rule, an association relationship between an SRS port of an SRS resource of the carrier and the antenna ports. For example, for an SRS resource, an SRS port of the SRS resource may be associated with an antenna port in ascending order of an index. In addition, a same SRS port number of different SRS resources may be associated with port numbers of different antenna ports connected to a same radio frequency link.

For a carrier, the network device may determine, in different manners, which antenna ports are originally associated with the carrier and which antenna ports are switched to the carrier by using a switch.

For example, in a manner, if the capability information sent by the UE indicates, in the first manner described above, the antenna ports supported by the P carriers, the UE may place, in the capability information, an index of an antenna port associated with a carrier before an index of an antenna port that can be switched to the carrier by using a switch. In this way, the network device can determine which antenna ports are originally associated with the carrier and which antenna ports are switched to the carrier by using the switch. For example, antenna ports supported by the 2.6 GHz carrier include the antenna port 0, the antenna port 1, the antenna port 2, and the antenna port 3. If the capability information sent by the UE indicates, in the first manner described above, the antenna ports supported by the P carriers, the capability information sent by the UE may include {the antenna port 2, the antenna port 3, the antenna port 0, the antenna port 1}, where the antenna port 2 and the antenna port 3 are associated with the 2.6 GHz carrier, and the antenna port 0 and the antenna port 1 can be switched to the 2.6 GHz carrier by using a switch.

For example, in another manner, if the capability information sent by the UE indicates, in the third manner described above, the antenna ports supported by the P carriers, for one of the P carriers, the network device may infer, according to the predefined rule and in antenna ports supported by the carrier, which antenna ports are originally associated with the carrier and which antenna ports are switched to the carrier by using a switch. For example, P=3, the three carriers are the 1.8 GHz carrier, the 2.1 GHz carrier, and the 2.6 GHz carrier, and quantities of antenna ports associated with the three carriers are 1, 1, and 2 respectively. If numbering is performed according to the predefined rule of ascending order of the frequencies of the carriers, the network device may determine that the antenna port 0 is an antenna port associated with the 1.8 GHz carrier, the antenna port 1 is an antenna port associated with the 2.1 GHz carrier, and the antenna port 2 and the antenna port 3 are antenna ports associated with the 2.6 GHz carrier.

Certainly, the network device may alternatively determine, in another manner and in antenna ports supported by a carrier, which antenna ports are associated with the carrier and which antenna ports are switched to the carrier by using a switch.

For example, for the 2.6 GHz carrier, the network device may infer, according to the predefined rule, antenna ports that can be connected to a same radio frequency link. For example, the predefined rule specifies that mapping is performed in ascending order of indexes of the antenna ports. In this case, the network device may determine that the antenna port 0 switched by using the switch may be connected to a radio frequency link connected to the antenna port 2 associated with the 2.6 GHz carrier, and the antenna port 1 switched by using the switch may be connected to a radio frequency link connected to the antenna port 3 associated with the 2.6 GHz carrier. Then, the network device may determine an association relationship between an SRS port of an SRS resource on the 2.6 GHz carrier and an antenna port according to the predefined rule. For example, the predefined rule specifies that, for an SRS resource, an SRS port is associated with an antenna port in ascending order of an index. In addition, a same SRS port number of different SRS resources may be associated with port numbers of different antenna ports connected to a same radio frequency link. For example, the network device configures the SRS resource 30 and the SRS resource 31 for the 2.6 GHz carrier. In this case, the network device may determine that the SRS port 0 of the SRS resource 30 is associated with the antenna port 2 in FIG. 5, the SRS port 1 of the SRS resource 30 is associated with the antenna port 3 in FIG. 5, the antenna port 0 of the SRS resource 31 is associated with the antenna port 0 in FIG. 5, and the SRS port 1 of the SRS resource 31 is associated with the antenna port 1 in FIG. 5.

S43: The UE determines, based on the configuration information, an antenna port associated with the first SRS resource.

After the UE receives the configuration information, the UE may send an SRS resource to the network device based on the configuration information, or send an SRS corresponding to the SRS resource. For example, the UE may send, to the network device, all SRSs configured by using the configuration information, or the UE may send, to the network device, some SRSs configured by using the configuration information. The following uses an example in which the UE needs to send, to the network device, an SRS corresponding to the first SRS resource (for example, the SRS corresponding to the first SRS resource is referred to as a first SRS below). The first SRS resource may be an SRS resource configured by using the configuration information.

For example, the UE may determine, based on Table 1 or FIG. 6, the antenna port associated with the first SRS resource, or the UE may determine, according to the predefined rule, the antenna port associated with the first SRS resource. For example, based on Table 1, if the first SRS resource is the SRS resource 30, the UE may determine that the SRS port 0 of the SRS resource 30 is associated with the antenna port 2, and the SRS port 1 of the SRS resource 30 is associated with the antenna port 3.

S44: The UE sends the first SRS to the network device through the determined antenna port, and correspondingly, the network device receives the first SRS from the UE.

If the UE determines one antenna port, the UE sends the first SRS through the antenna port. Alternatively, if the UE determines a plurality of antenna ports, the UE sends a plurality of first SRSs through the plurality of antenna ports. For example, if the first SRS resource is the SRS resource 30, the UE sends a first SRS corresponding to the SRS port 0 through the antenna port 2, and sends a first SRS corresponding to the SRS port 1 through the antenna port 3.

After receiving the first SRS, the network device may determine, based on the configuration information, the antenna port that is of the UE and that corresponds to the first SRS resource, and may determine a carrier corresponding to the first SRS resource, so that the network device may perform, by measuring the first SRS, channel estimation on an uplink channel corresponding to each antenna port on the carrier. For example, if the first SRS resource is the SRS resource 30, the UE sends the first SRS corresponding to the SRS port 0 through the antenna port 2, and sends the first SRS corresponding to the SRS port 1 through the antenna port 3. In this case, after receiving the first SRS, the network device may perform channel estimation on an uplink channel corresponding to the antenna port 2 on the 2.6 GHz carrier of the UE, or may perform channel estimation on an uplink channel corresponding to the antenna port 3 on the 2.6 GHz carrier of the UE.

S45: The network device sends scheduling information to the UE, and correspondingly, the UE receives the scheduling information from the network device. The scheduling information may be used to schedule uplink data on the first carrier, and the first carrier is a carrier configured for the UE. After performing channel estimation on an uplink channel corresponding to the antenna port supported by each carrier of the UE, the network device may select, based on a channel estimation result, a carrier with good channel quality and an antenna port supported by the carrier, to schedule the UE to send uplink data on the uplink carrier through the antenna port. In a manner in which the network device schedules the uplink data, the network device schedules a physical uplink shared channel (PUSCH), and the PUSCH carries the uplink data.

When scheduling the uplink data, the network device may determine a feasible antenna switching combination. For example, based on the UE capability shown in FIG. 5, connecting the antenna port 0 and the antenna port 2 to a same radio frequency link is a feasible combination, and connecting the antenna port 0 and the antenna port 3 to a same radio frequency link is an infeasible combination. In a possible implementation, both the network device and the UE comply with a same antenna switching rule. For example, the rule includes: If a maximum quantity of transport layers that can be supported by a carrier is greater than 1, a mapping manner between an antenna port that can be switched to the carrier and a radio frequency link associated with the carrier complies with a one-to-one mapping manner in ascending order of antenna port numbers. For example, in FIG. 5, numbers of the antenna ports associated with the 2.6 GHz carrier are 2 and 3, and numbers of the antenna ports that can be switched to the 2.6 GHz carrier are 0 and 1. In this case, both the network device and the UE comply with that the antenna port 0 can be switched to the radio frequency link connected to the antenna port 2, and the antenna port 1 can be switched to the radio frequency link connected to the antenna port 3.

For example, the scheduling information may include second information, and the second information may indicate an SRS port of an SRS resource associated with the antenna port used to send the uplink data. For example, if the network device needs to schedule the UE to send the uplink data on the first carrier, the network device may select an appropriate antenna port for the UE based on a channel estimation result of an uplink channel corresponding to the antenna port on the first carrier, and indicate, by using the scheduling information, an SRS port of an SRS resource associated with the selected antenna port.

Alternatively, if the network device needs to schedule the uplink data of the UE, the network device may select an appropriate carrier for the UE based on the channel estimation result of the uplink channel corresponding to the antenna port on each carrier configured for the UE, select an appropriate antenna port on the carrier, and indicate, by using the scheduling information, an SRS port of an SRS resource associated with the selected antenna port.

If the network device schedules the uplink data on the first carrier, the network device may send the scheduling information on the first carrier. In an optional implementation, the second information included in the scheduling information may be implemented by using a bitmap. For example, based on the UE capability shown in FIG. 5, if the network device schedules to send the uplink data on the 1.8 GHz carrier through the antenna port 0, the second information may be {1, 0}. Because each SRS resource of the 1.8 GHz carrier corresponds to one SRS port, it may be considered that the 2 bits respectively represent the two SRS resources corresponding to the 1.8 GHz carrier. For example, a left bit represents the SRS port 0 of the SRS resource 10, and a right bit represents the SRS port 0 of the SRS resource 11. A value of the left bit being "1" indicates that the SRS port 0 of the SRS resource 10 is scheduled, and a value of the right bit being "0" indicates that the SRS port 0 of the SRS resource 11 is not scheduled. For another example, if the network device schedules to send the uplink data on the 2.1 GHz carrier through the antenna port 0 and the antenna port 1, the second information may be {1, 1}. Similarly, it may be considered that the 2 bits respectively represent the two SRS resources corresponding to the 2.1 GHz carrier. For example, a left bit represents the SRS port 0 of the SRS resource 20, and a right bit represents the SRS port 0 of the SRS resource 21. For another example, if the network device schedules to send the uplink data on the 2.6 GHz carrier through the antenna port 0, the antenna port 1, the antenna port 2, and the antenna port 3, the second information may be {1, 1, 1, 1}, and the 4 bits respectively represent the total four SRS ports of the two SRS resources corresponding to the 2.6 GHz carrier.

If the antenna port is further connected to a phase shifter, for example, in the UE shown in FIG. 2, the first switch 102 is further connected to the first phase shifter 105, optionally, the scheduling information may further include third information, and the third information may indicate a phase of the scheduled antenna port. For example, if the second information indicates the SRS port of the SRS resource associated with the first antenna port, the third information may indicate a phase of the first antenna port after the first antenna port is connected to a radio frequency link associated with the first carrier. If the second information indicates a plurality of SRS ports, the third information may indicate phases of antenna ports associated with the plurality of SRS ports after the antenna ports are connected to a radio frequency link associated with the first carrier. For example, the third information may include $[\log_2 Q_{PS}]$ bits, where [x] represents rounding up x, and $Q_{PS}$ represents a quantity of quantized bits of the phase shifter. For example, theoretically, the phase shifter needs to be capable of indicating any phase between 0 and 360°. However, an actual phase shifter product may not achieve the precision. Therefore, the phase shifter may be able to indicate only some phases between 0° and 360°. In this case, a phase that can be reached by the phase shifter may be indicated by $Q_{PS}$ bits, and therefore $Q_{PS}$ is referred to as the quantity of quantization bits of the phase shifter. For example, if phases that can be obtained by the phase shifter include 60°, 90°, 180°, and 270°, $Q_{PS}$ may be equal to 2, and the four phases can be indicated by 2 bits.

For example, based on the UE capability shown in FIG. 5, the network device schedules to send the uplink data on the 1.8 GHz carrier through the SRS port 0 of the SRS resource 10, and the antenna port 0 associated with the SRS port 0 of the SRS resource 10 on the 1.8 GHz carrier is an antenna port associated with the 1.8 GHz carrier. Therefore, a phase change is not required. In this case, the scheduling information may not include the third information. For another example, the network device schedules to send the uplink data on the 2.6 GHz carrier through the SRS port 0 and the SRS port 1 of the SRS resource 30 and the SRS port 2 and the SRS port 3 of the SRS resource 31, and the antenna port 2 associated with the SRS port 0 of the SRS resource 30 and the antenna port 3 associated with the SRS port 3 of the SRS resource 30 are both antenna ports associated with the 2.6 GHz carrier. Therefore, a phase change may not be required. However, both the antenna port 0 associated with the SRS port 0 of the SRS resource 31 and the antenna port 1 associated with the SRS port 1 of the SRS resource 31 can be switched to the 2.1 GHz carrier only by using a switch. In this case, the scheduling information may include the third information, and the third information may indicate a phase of the antenna port 0 after the antenna port is switched to the 2.1 GHz carrier, and indicate a phase of the antenna port 1 after the antenna port is switched to the 2.1 GHz carrier.

S46: The UE sends the uplink data to the network device on the first carrier, and correspondingly, the network device receives the uplink data from the UE. For example, the UE may send the uplink data to the network device on the first carrier based on the antenna port associated with the SRS port indicated by the scheduling information.

If the scheduling information indicates SRS ports of SRS resources, and the UE connects antenna ports associated with the SRS ports of the SRS resources to the radio frequency link associated with the first carrier, and sends the uplink data through the antenna ports. In addition, if the second scheduling information further includes the third information, the UE may further adjust a phase of a corresponding antenna port based on the third information.

S43 to S46 are optional steps, and therefore are represented by dashed lines in FIG. 4.

To better understand effect brought by embodiments of this application, the following describes simulation results of embodiments of this application.

Figure 7:
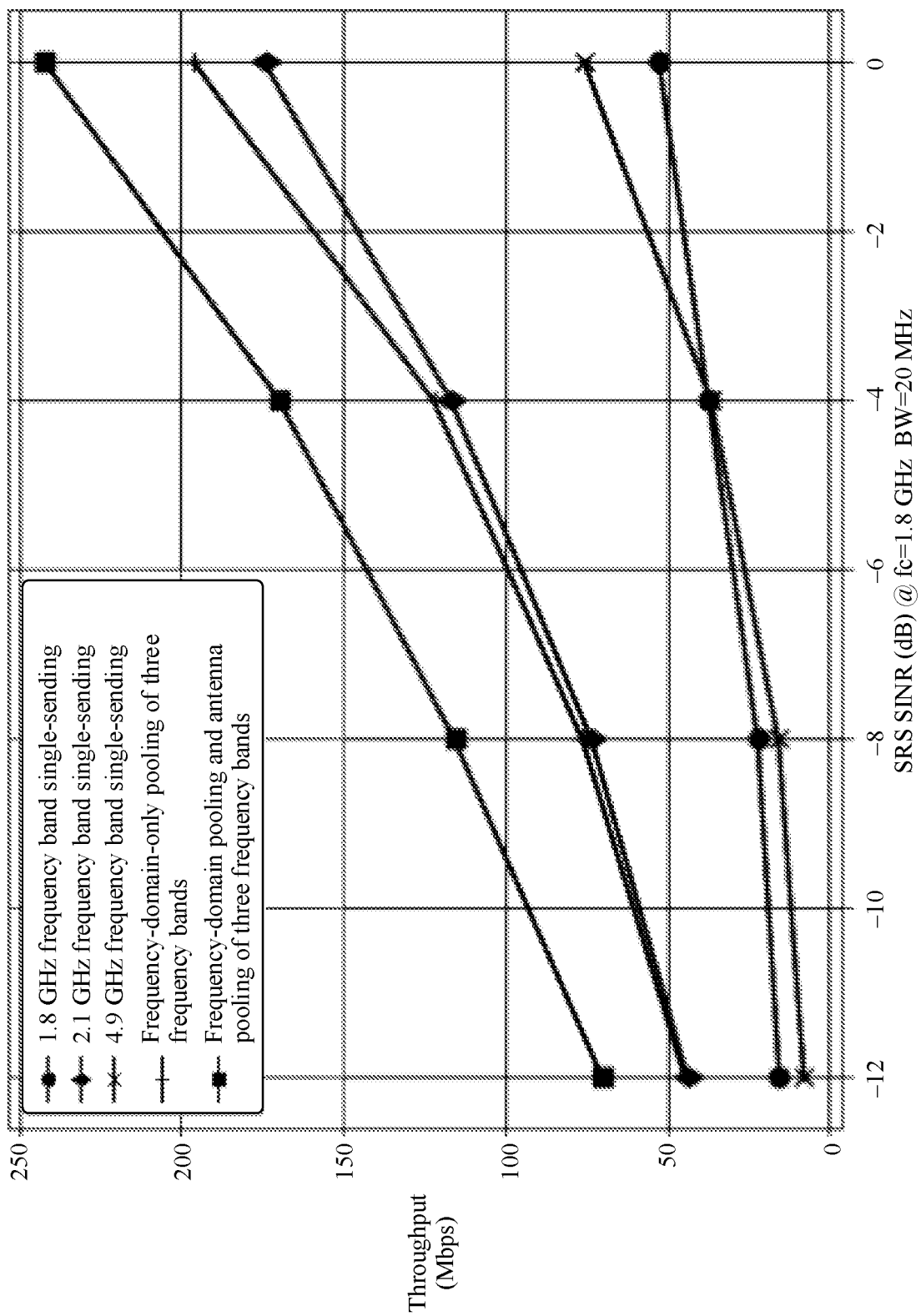
FIG. 7 is a schematic diagram of a simulation result of a solution according to an embodiment of this application.

For example, FIG. 7 may be obtained based on simulation parameters in Table 2. In FIG. 7, uplink capacity performance of different mechanisms is compared. The mechanisms include: 1. 1.8 GHz carrier 1 Tx transmission; 2. 2.1 GHz carrier 1 Tx transmission; 3. 4.9 GHz carrier 2 Tx transmission; 4. frequency-domain-only pooling (CA) of three carriers 1 Tx+1 Tx+2 Tx concurrency; and 5. an antenna port resource pooling solution provided in embodiments of this application. 1 Tx means that one uplink transmit channel is used for sending, and 2 Tx means that two uplink transmit channels are used for sending.

TABLE 2

| Simulation parameter | | | |
| --- | --- | --- | --- |
| Carrier frequency (GHz) | 1.8 | 2.1 | 4.9 |
| Bandwidth (MHz) | 20 | 55 | 100 |
| Subcarrier spacing (kHz) | 30 | 30 | 30 |
| Quantity of antennas of a base station | 4 | 32 | 64 |
| Quantity of antennas of UE | 1 | 1 | 2 |
| Gain per (Per) receive (RX) antenna (dBi) | 16.9 | 10.5 | 9.5 |
| Gain per transmit (TX) antenna (dBi) | 0 | 0 | 0 |
| Penetration loss (dB) | 21.74 | 22.76 | 29.51 |
| Interference margin (dB) | 3 | 2 | 2 |
| Maximum UE transmit power (dBm) | | 23 | |
| Channel model | Clustered delay line ( ~~Clustered Delay Line,~~ CDL)-A | | |

According to FIG. 7, Table 3 shows gains of corresponding mechanisms.

TABLE 3

| Signal to interference plus noise ratio (SINR) (dB) | −8 | −4 | 0 |
| --- | --- | --- | --- |
| Gain of resource pooling compared with frequency-domain-only pooling | 51.96% | 39.05% | 23.50% |
| Gain of frequency-domain-only pooling compared with single-carrier sending | 3.86% | 4.61% | 12.46% |

It can be learned from Table 3 that, compared with the first three single-carrier sending solutions, the fourth solution, namely, the frequency-domain-only pooling solution, has a limited performance gain, that is, a performance gain of only 12%. In the solution provided in embodiments of this application, a frequency domain resource and an antenna resource are pooled, so that an uplink capacity may be further increased, and a throughput may reach 1.24 times that of CA.

In conclusion, in embodiments of this application, a new radio frequency link architecture is designed for the UE. By adding a switch and a phase shifter, an antenna port can be switched between a plurality of carriers, to obtain a beamforming gain of an analog-digital hybrid precoding structure. In addition, in embodiments of this application, based on the new radio frequency link architecture, a new UE capability is designed, and an association relationship between SRS ports of a plurality of SRS resources of the carriers configured for the UE and the antenna ports of the UE is established, to allow the network device to obtain uplink channel information by measuring an SRS, so that the network device can select an optimal antenna port switching solution for the UE. Resource pooling is performed on antenna port resources of the UE, to allow each antenna port of the UE to be switched to different carriers based on instantaneous channel conditions. In this way, a beamforming gain that can be obtained by each carrier is flexibly adjusted, thereby improving uplink transmission performance.

Figure 8:
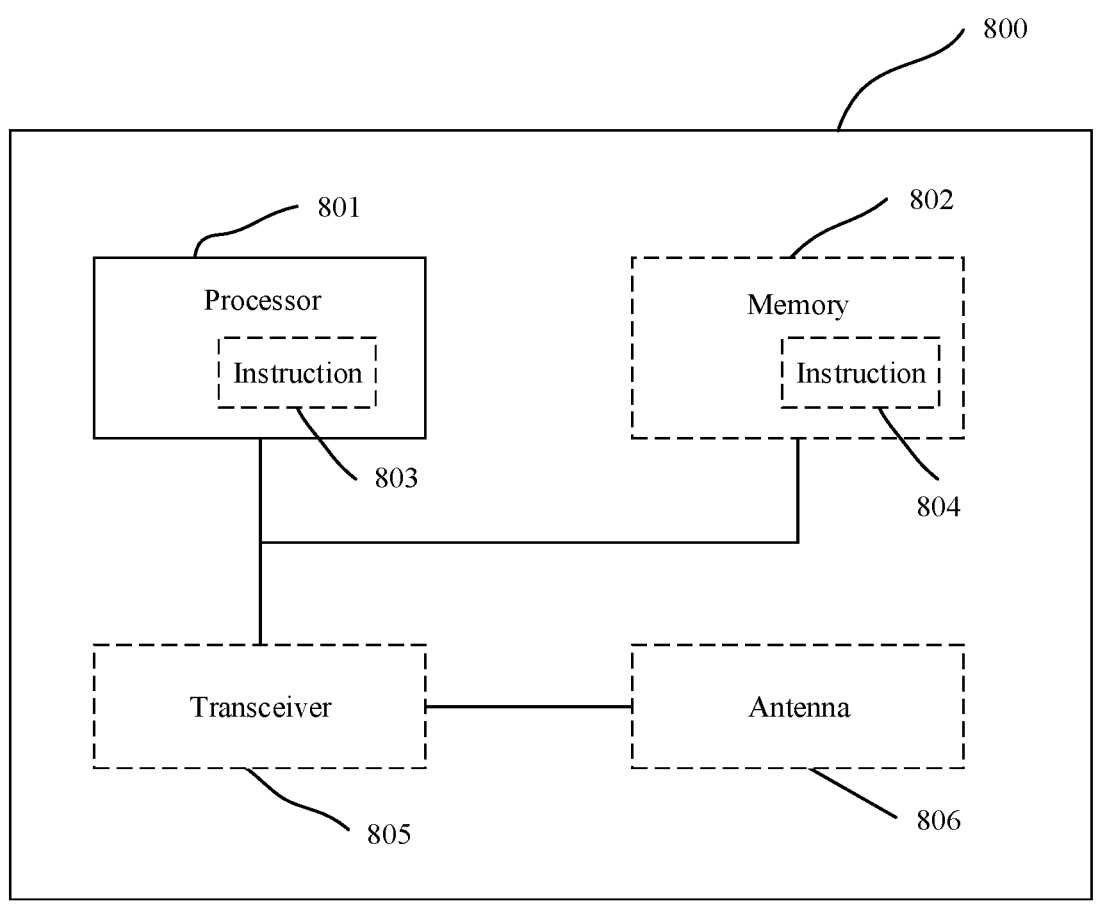
FIG. 8 is a schematic block diagram of a communication apparatus according to an embodiment of this application.

FIG. 8 is a schematic diagram of a structure of a communication apparatus according to an embodiment of this application. The communication apparatus 800 may be the terminal device in the embodiment shown in FIG. 4, and is configured to implement the method performed by the terminal device in the method embodiment. Alternatively, the communication apparatus 800 may be the network device in the embodiment shown in FIG. 4, and is configured to implement the method corresponding to the network device in the method embodiment. For a specific function, refer to the description in the method embodiment.

The communication apparatus 800 includes one or more processors 801. The processor 801 may also be referred to as a processing unit, and may implement a specific control function. The processor 801 may be a general-purpose processor, a dedicated processor, or the like. For example, the processor includes a baseband processor, a central processing unit, an application processor, a modem processor, a graphics processing unit, an image signal processor, a digital signal processor, a video codec processor, a controller, a memory, and/or a neural-network processing unit. The baseband processor may be configured to process a communication protocol and communication data. The central processing unit may be configured to control the communication apparatus 800, execute software programs, and/or process data. Different processors may be independent components, or may be integrated into one or more processors, for example, integrated into one or more application-specific integrated circuits.

Optionally, the communication apparatus 800 includes one or more memories 802, configured to store instructions 804. The instructions 804 may be run on the processor, so that the communication apparatus 800 performs the method described in the method embodiment. Optionally, the memory 802 may further store data. The processor and the memory may be separately disposed, or may be integrated together.

Optionally, the communication apparatus 800 may include instructions 803 (sometimes may also be referred to as code or a program), and the instructions 803 may be run on the processor, so that the communication apparatus 800 performs the method described in the foregoing embodiment. The processor 801 may store data.

Optionally, the communication apparatus 800 may further include a transceiver 805 and an antenna 806. The transceiver 805 may be referred to as a transceiver unit, a transceiver circuit, an input/output interface, or the like, and is configured to implement a transceiver function of the communication apparatus 800 through the antenna 806. Optionally, the communication apparatus 800 and the UE shown in FIG. 1 or FIG. 2 may be a same apparatus, or may be different apparatuses. If the communication apparatus 800 and the UE shown in FIG. 1 or FIG. 2 are a same apparatus, the transceiver 805 includes, for example, the N radio frequency links shown in FIG. 1 or FIG. 2, and the antenna 806 is implemented as, for example, the at least one antenna port shown in FIG. 1 or FIG. 2.

Optionally, the communication apparatus 800 may further include one or more of the following components: a wireless communication module, an audio module, an external memory interface, an internal memory, a universal serial bus (USB) interface, a power management module, an antenna, a speaker, a microphone, an input/output module, a sensor module, a motor, a camera, or a display, or the like. It may be understood that, in some embodiments, the communication apparatus 800 may include more or fewer components, or some components may be integrated, or some components may be split. These components may be hardware, software, or a combination of software and hardware.

The processor 801 and the transceiver 805 described in this embodiment of this application may be implemented in an integrated circuit (IC), an analog IC, a radio frequency integrated circuit (RFIC), a hybrid signal IC, an application-specific integrated circuit (ASIC), a printed circuit board (PCB), an electronic device, or the like. A communication apparatus that implements the communication apparatus described in this specification may be an independent device (for example, an independent integrated circuit, and a mobile phone), or may be a part of a larger device (for example, a module that can be embedded in another device). For details, refer to the foregoing descriptions of the terminal device and the network device. Details are not described herein again.

An embodiment of this application provides a terminal device. The terminal device (for ease of description, referred to as UE) may be used in the foregoing embodiments. The terminal device includes a corresponding means, a unit, and/or a circuit used to implement the function of the UE in the embodiment shown in FIG. 4. For example, the terminal device includes a transceiver module, configured to support the terminal device in implementing a transceiver function, and a processing module, configured to support the terminal device in processing a signal.

Figure 9:
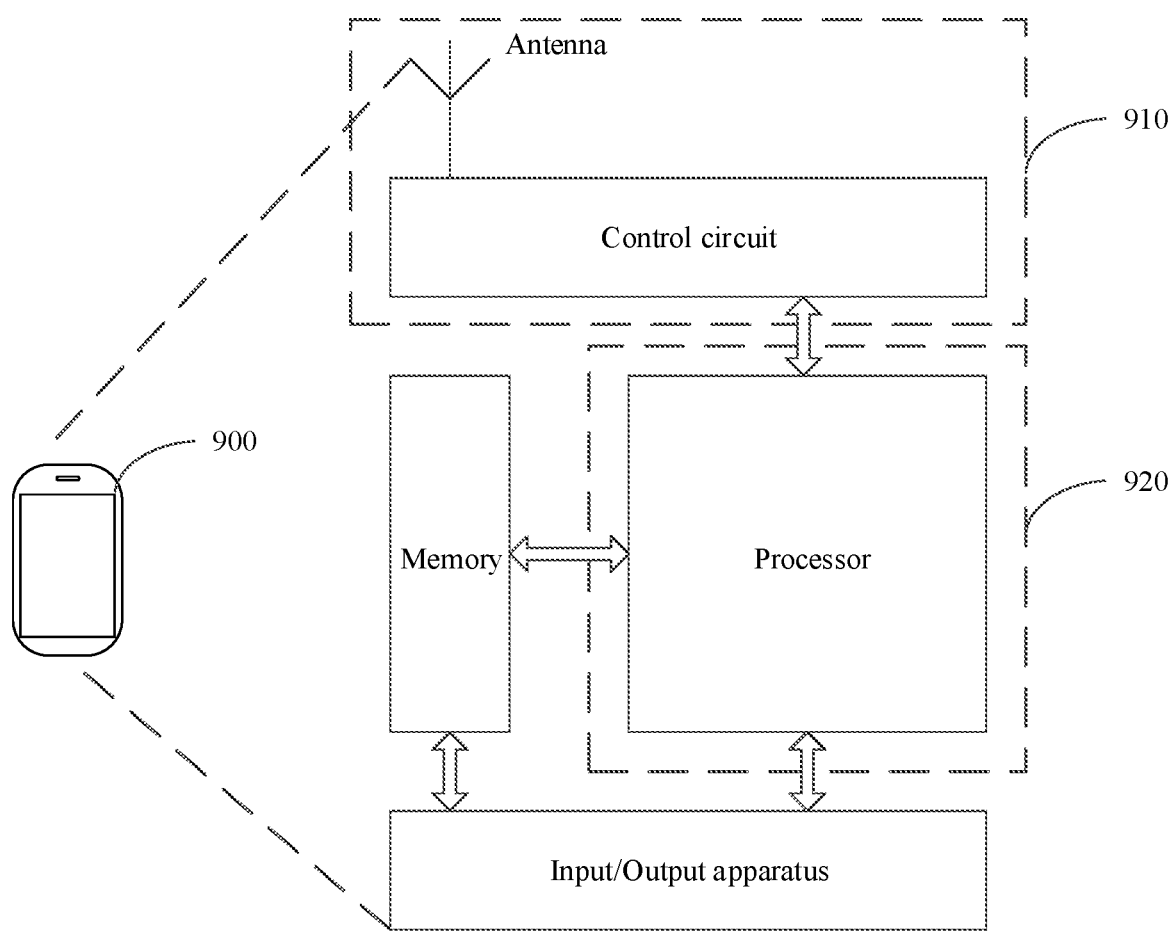
FIG. 9 is a schematic block diagram of a terminal device according to an embodiment of this application.

FIG. 9 is a schematic diagram of a structure of a terminal device according to an embodiment of this application.

The terminal device 900 may be applied to the architecture shown in FIG. 3. For ease of description, FIG. 9 only shows main components of the terminal device 900. As shown in FIG. 9, the terminal device 900 includes a processor, a memory, a control circuit, an antenna, and an input/output apparatus. The processor is mainly configured to: process a communication protocol and communication data, control the entire terminal device 900, execute a software program, and process data of the software program. The memory is mainly configured to store the software program and the data. The control circuit is mainly configured to convert a baseband signal and a radio frequency signal and process the radio frequency signal. The antenna is mainly configured to send and receive radio frequency signals in a form of an electromagnetic wave. The input/output apparatus, such as a touchscreen, a display, or a microphone, or a keyboard, is mainly configured to receive data input by a user and output data to the user.

That the terminal device 900 is a mobile phone is used as an example. After the terminal device 900 is powered on, the processor may read a software program in a storage unit, interpret and execute instructions of the software program, and process data of the software program. When data needs to be sent wirelessly, after performing baseband processing on the to-be-sent data, the processor outputs a baseband signal to the control circuit. The control circuit performs radio frequency processing on the baseband signal, and then sends the radio frequency signal to the outside through the antenna in a form of an electromagnetic wave. When data is sent to the terminal device 900, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 9 shows only one memory and only one processor. In some embodiments, the terminal device 900 may include a plurality of processors and memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal device 900, execute the software program, and process the data of the software program. The processor in FIG. 9 integrates functions of the baseband processor and the central processing unit. A person skilled in the art may understand that the baseband processor and the central processing unit may alternatively be independent processors, and are interconnected by using a technology such as a bus. The terminal device 900 may include a plurality of baseband processors to adapt to different network standards, and the terminal device 900 may include a plurality of central processing units to enhance a processing capability of the terminal device. Components of the terminal device 900 may be connected through various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have receiving and sending functions may be considered as a transceiver unit 910 of the terminal device 900, and the processor having a processing function may be considered as a processing unit 920 of the terminal device 900. As shown in FIG. 9, the terminal device 900 includes the transceiver unit 910 and the processing unit 920. The transceiver unit may also be referred to as a transceiver, a transceiver machine, a transceiver apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. For example, the receiving unit may also be referred to as a receiver, a receive machine, a receiving circuit, or the like, and the sending unit may also be referred to as a transmitter, a transmit machine, a transmitting circuit, or the like. Optionally, the terminal device 900 and the UE shown in FIG. 1 or FIG. 2 may be a same apparatus, or may be different apparatuses. If the terminal device 900 and the UE shown in FIG. 1 or FIG. 2 are a same apparatus, the transceiver unit 910 includes, for example, the at least one radio frequency link and the N antenna ports shown in FIG. 1 or FIG. 2.

An embodiment of this application further provides a network device. The network device may be used in the foregoing embodiments. The network device includes a means, a unit, and/or a circuit used to implement the function of the network device in the embodiment shown in FIG. 4. For example, the network device includes a transceiver module, configured to support the network device in implementing a transceiver function, and a processing module, configured to support the network device in processing a signal.

Figure 10:
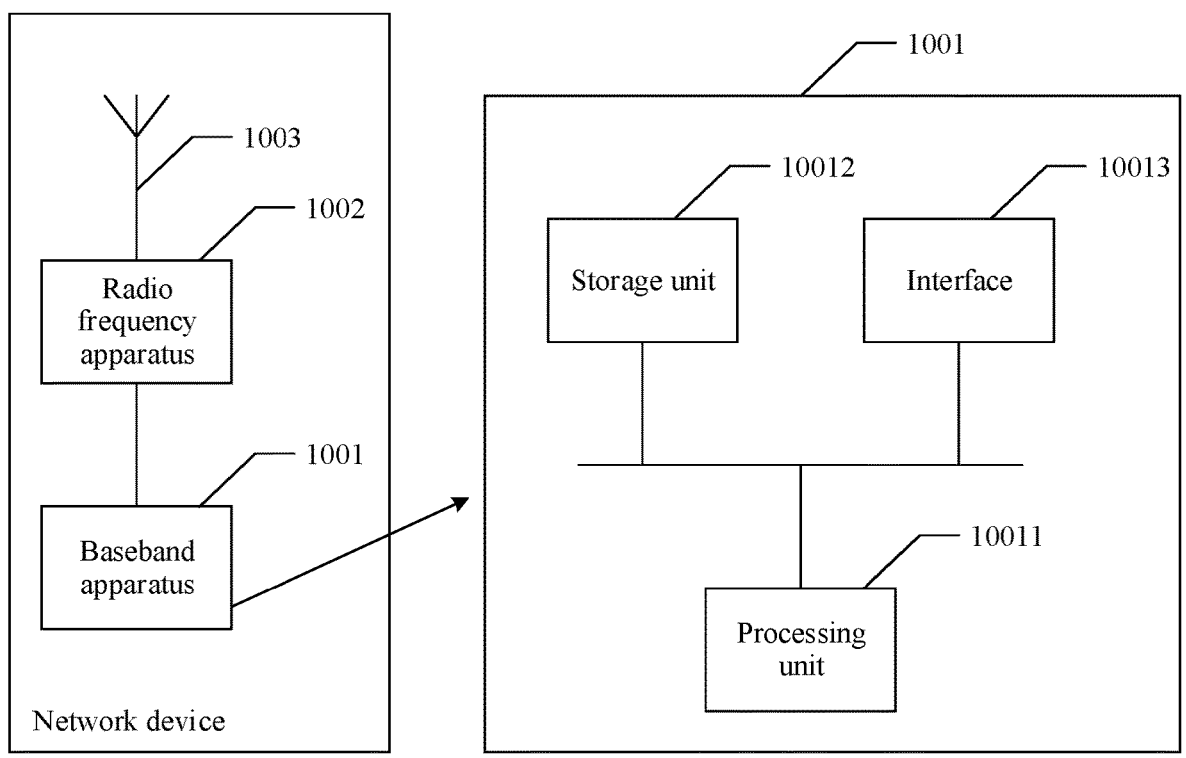
FIG. 10 is a schematic block diagram of a network device according to an embodiment of this application.

FIG. 10 is a schematic diagram of a structure of a network device according to an embodiment of this application. As shown in FIG. 10, the network device may be applied to the architecture shown in FIG. 3, for example, an access network device in the architecture. The network device includes a baseband apparatus 1001, a radio frequency apparatus 1002, and an antenna 1003. In an uplink direction, the radio frequency apparatus 1002 receives, through the antenna 1003, information sent by a terminal device, and sends, to the baseband apparatus 1001 for processing, the information sent by the terminal device. In a downlink direction, the baseband apparatus 1001 processes information of the terminal device, and sends the information to the radio frequency apparatus 1002. The radio frequency apparatus 1002 processes the information of the terminal device, and then sends the processed information to the terminal device through the antenna 1003.

The baseband apparatus 1001 includes one or more processing units 10011, a storage unit 10012, and an interface 10013. The processing unit 10011 is configured to support the network device in performing a function of the network device in the method embodiments. The storage unit 10012 is configured to store a software program and/or data. The interface 10013 is configured to exchange information with the radio frequency apparatus 1002. The interface includes an interface circuit, configured to input and output information. In an implementation, the processing unit is an integrated circuit, for example, one or more ASICs, one or more DSPs, one or more FPGAs, or a combination of these types of integrated circuits. These integrated circuits may be integrated together to form a chip. The storage unit 10012 may be located in a same chip as the processing unit 10011, that is, may be an on-chip storage element. Alternatively, the storage unit 10012 may be located on a chip different from that of the processing unit 10011, that is, may be an off-chip storage element. The storage unit 10012 may be one memory, or may be a collective name of a plurality of memories or storage elements.

The network device may implement some or all of the steps in the method embodiments in a form of scheduling programs by one or more processing units. For example, a corresponding function of the network device in the embodiment shown in FIG. 4 is implemented. The one or more processing units may support radio access technologies of a same standard, or may support radio access technologies of different standards.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular application and a design constraint of the technical solutions. A person skilled in the art may use different methods to implement the described functions of each particular application, but it should not be considered that the implementation goes beyond the scope of this application.

In the several embodiments provided in this application, it should be understood that the disclosed system, apparatus, and method may be implemented in another manner. For example, the described apparatus embodiment is merely an example. For example, the unit division is merely logical function division, units described as separate parts may or may not be physically separate, and parts displayed as units may or may not be physical units. That is, it may be located in one place, or it may be distributed on a plurality of network units. Some or all of the units may be selected based on an actual requirement to achieve the objectives of the solutions of embodiments.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a computer software product. The computer software product is stored in a storage medium, and includes several instructions for instructing a computer device (which may be a personal computer, a server, or a network device) to perform all or some of the steps of the methods described in embodiments of this application. The computer-readable storage medium may be any usable medium that can be accessed by a computer. For example, but not limited to, the computer-readable medium may include a random access memory (RAM), a read-only memory (ROM), and a programmable read-only memory (programmable ROM, PROM), erasable programmable read-only memory (erasable PROM, EPROM), electrically erasable programmable read-only memory (EEPROM), compact disc read-only memory (CD-ROM), universal serial bus flash disk (universal serial bus flash disk), removable hard disk, or other optical disk storage, disk storage medium or other magnetic storage device, or can be used to carry or store desired program code in the form of instructions or data structures and can be used by a computer access to any other media. In addition, through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), or a direct rambus dynamic random access memory (direct rambus RAM, DR RAM).

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
   sending a first message to a network device, wherein:
      the first message comprises capability information of a terminal device,
      the capability information indicates antenna ports supported by P frequency domain units of the terminal device,
      an antenna port supported by an $i^{th}$ frequency domain unit in the P frequency domain units comprises an antenna port associated with the $i^{th}$ frequency domain unit and an antenna port that can be switched to the $i^{th}$ frequency domain unit in antenna ports associated with $N_i$ frequency domain units in the P frequency domain units,
      the $N_i$ frequency domain units do not comprise the $i^{th}$ frequency domain unit,
      at least two of the P frequency domain units are associated with respective uplink transmission configuration information,
      P is an integer greater than 1, and
      $N_i$ is an integer greater than or equal to 1 and less than P; and
   receiving configuration information from the network device, wherein
      the configuration information configures at least two sounding reference signal (SRS) resources for a first frequency domain unit of the terminal device,
      the first frequency domain unit is associated with first uplink transmission configuration information, and
      SRS ports of the at least two SRS resources of the first frequency domain unit are associated with an antenna port supported by the first frequency domain unit.

2. The method of claim 1, wherein the capability information comprises:
   an indication of an index $x_i$ of the antenna port supported by the $i^{th}$ frequency domain unit in the P frequency domain units, wherein $x_i$ is an integer greater than or equal to 1 and less than or equal to $N_t$ or $x_i$ is a nonnegative integer less than $N_t$ and $N_t$ is a total quantity of antenna ports associated with the P frequency domain units; or
   an indication of a total quantity $N_t$ of antenna ports of the terminal device, wherein the P frequency domain units are associated with the $N_t$ antenna ports.

3. The method of claim 1, wherein:
   the capability information comprises an indication of a quantity $M_i$ of antenna ports associated with the $i^{th}$ frequency domain unit in the P frequency domain units;
   the first message further comprises first information;
   the first information indicates information that the $M_i$ antenna ports can be switched to a $j^{th}$ frequency domain unit;
   i is not equal to j; and
   i and j are integers greater than or equal to 1 and less than or equal to P.

4. The method of claim 3, wherein that the first information comprises:
   an indication of a quantity of antenna ports that can be switched to the $j^{th}$ frequency domain unit in the $M_i$ antenna ports; or
   an indication that an $m^{th}$ antenna port in the $M_i$ antenna ports can be switched to the $j^{th}$ frequency domain unit, wherein m=1, 2, . . . , or $M_i$, or m=0, 1, . . . , or $M_i-1$.

5. The method of claim 1, wherein
   the configuration information further configures an association relationship between different SRS ports of the at least two SRS resources and different antenna ports supported by the first frequency domain unit; and
   there is an association relationship between one SRS port and one antenna port, to instruct the terminal device to send an SRS of the SRS port through the antenna port.

6. The method of claim 1, wherein
   the configuration information further configures a second SRS resource for a second frequency domain unit of the terminal device;
   when the second SRS resource and a first SRS resource occupy a same time unit, the second SRS resource and the first SRS resource are not associated with a same antenna port; and
   the first SRS resource is one of the at least two SRS resources.

7. The method of claim 1, wherein the method further comprises:
   receiving scheduling information from the network device, wherein
      the scheduling information is configured to schedule uplink data on the first frequency domain unit,
      the scheduling information further comprises second information, and
      the second information comprises an indication of an SRS port that is of an SRS resource and that is associated with an antenna port for sending the uplink data; and
   sending the uplink data to the network device through the antenna port associated with the SRS port of the SRS resource.

8. The method of claim 7, wherein:
   the SRS port indicated by the second information comprises a first SRS port;
   the scheduling information further comprises third information; and
   the third information indicates a phase of an antenna port associated with the first SRS port.

9. A communication method, comprising:
   receiving a first message from a terminal device, wherein:
      the first message comprises capability information of the terminal device, the capability information indicates antenna ports supported by P frequency domain units of the terminal device, an antenna port supported by an $i^{th}$ frequency domain unit in the P frequency domain units comprises an antenna port associated with the $i^{th}$ frequency domain unit and an antenna port that can be switched to the $i^{th}$ frequency domain unit in antenna ports associated with $N_i$ frequency domain units in the P frequency domain units, the $N_i$ frequency domain units do not comprise the $i^{th}$ frequency domain unit, at least two of the P frequency domain units are associated with respective uplink transmission configuration information, P is an integer greater than 1, and $N_i$ is an integer greater than or equal to 1 and less than P; and sending configuration information to the terminal device, wherein the configuration information configures at least two sounding reference signal (SRS) resources for a first frequency domain unit of the terminal device, the first frequency domain unit is associated with first uplink transmission configuration information, and SRS ports of the at least two SRS resources of the first frequency domain unit are associated with an antenna port supported by the first frequency domain unit.

10. The method of claim 9, wherein that the capability information comprises:

an indication of an index $x_i$ of the antenna port supported by the $i^{th}$ frequency domain unit in the P frequency domain units, wherein $x_i$ is an integer greater than or equal to 1 and less than or equal to $N_t$ or $x_i$ is a nonnegative integer less than $N_t$ and $N_t$ is a total quantity of antenna ports associated with the P frequency domain units; or the capability information indicates a total quantity $N_t$ of antenna ports of the terminal device, and the P frequency domain units are associated with the $N_t$ antenna ports.

11. The method of claim 9, wherein that the capability information indicates antenna ports supported by P frequency domain units of the terminal device comprises:

the capability information an indication of a quantity $M_i$ of antenna ports associated with the $i^{th}$ frequency domain unit in the P frequency domain units;

the first message further comprises first information;

the first information indicates information that the $M_i$ antenna ports can be switched to a $j^{th}$ frequency domain unit;

i is not equal to j; and i and j are integers greater than or equal to 1 and less than or equal to P.

12. The method of claim 11, wherein that the first information comprises:

an indication of a quantity of antenna ports that can be switched to the $j^{th}$ frequency domain unit in the $M_i$ antenna ports; or an indication that that an $m^{th}$ antenna port in the $M_i$ antenna ports can be switched to the $j^{th}$ frequency domain unit, wherein m=1, 2, . . . , or $M_i$, or m=0, 1, . . . , or $M_i$-1.

13. The method of claim 9, wherein the configuration information further configures an association relationship between an SRS port of the one or more SRS resources and an antenna port supported by the first frequency domain unit;

the association relationship between the SRS port of the one or more SRS resources and the antenna port supported by the first frequency domain unit is configured to be used to indicate an antenna port used by the terminal device to send an SRS corresponding to the SRS port; and a number of SRS ports of an SRS resource of the first frequency domain unit is a positive integer less than or equal to a number of antenna ports supported by the first frequency domain unit.

14. The method of claim 9, wherein the configuration information further configures an association relationship between different SRS ports of the at least two SRS resources and different antenna ports supported by the first frequency domain unit; and there is an association relationship between one SRS port and one antenna port to instruct the terminal device to send an SRS of the SRS port through the antenna port.

15. The method of claim 9, wherein the method further comprises:

when a first condition is met, sending new configuration information to the terminal device, wherein the new configuration information configures at least one SRS resource for the first frequency domain unit.

16. The method of claim 15, wherein the configuration information further configures an association relationship between an SRS port of the at least one SRS resource and the antenna port supported by the first frequency domain unit.

17. The method of claim 15, wherein the first condition comprises one or more of the following:

an uplink channel quality of the terminal device is lower than a first threshold;

a duration between start time and current time reaches first duration, wherein time at which the configuration information is sent is used as the start time;

an indication that the terminal device is handed over to a new cell;

a value of a first parameter of the terminal device changes; or an indication that trigger information from the terminal device is received, wherein the trigger information provides an indication to reconfigure an SRS resource.

18. The method of claim 9, wherein the method further comprises:

sending scheduling information to the terminal device, wherein:

the scheduling information is configured to schedule uplink data on the first frequency domain unit, the scheduling information further comprises second information, and the second information indicates an SRS port that is of an SRS resource and that is associated with an antenna port for sending the uplink data; and sending, by the terminal device, the uplink data to a network device through the antenna port associated with the SRS port of the SRS resource.

19. A terminal device comprising:

a processor;

a memory coupled to the processor; and a computer program code stored in the memory, wherein the computer program code comprises instructions that, when run on the processor, the processor is enabled to perform the steps of:

sending a first message to a network device, wherein:
- the first message comprises capability information of a terminal device,
- the capability information indicates antenna ports supported by P frequency domain units of the terminal device,
- an antenna port supported by an $i^{th}$ frequency domain unit in the P frequency domain units comprises an antenna port associated with the $i^{th}$ frequency domain unit and an antenna port that can be switched to the $i^{th}$ frequency domain unit in antenna ports associated with $N_i$ frequency domain units in the P frequency domain units,
- the $N_i$ frequency domain units do not comprise the $i^{th}$ frequency domain unit,
- at least two of the P frequency domain units are associated with respective uplink transmission configuration information,
- P is an integer greater than 1, and
- $N_i$ is an integer greater than or equal to 1 and less than P; and receiving configuration information from the network device, wherein:
- the configuration information configures at least two sounding reference signal (SRS) resources for a first frequency domain unit of the terminal device,
- the first frequency domain unit is associated with first uplink transmission configuration information, and
- SRS ports of the at least two SRS resources of the first frequency domain unit are associated with an antenna port supported by the first frequency domain unit.

20. A non-transitory computer-readable storage medium, with computer program code stored thereon, wherein the computer program code comprises instructions that, when run on a terminal device, the terminal device is enabled to perform:

sending a first message to a network device, wherein:
- the first message comprises capability information of a terminal device,
- the capability information indicates antenna ports supported by P frequency domain units of the terminal device,
- an antenna port supported by an $i^{th}$ frequency domain unit in the P frequency domain units comprises an antenna port associated with the $i^{th}$ frequency domain unit and an antenna port that can be switched to the $i^{th}$ frequency domain unit in antenna ports associated with $N_i$ frequency domain units in the P frequency domain units,
- the $N_i$ frequency domain units do not comprise the $i^{th}$ frequency domain unit,
- at least two of the P frequency domain units are associated with respective uplink transmission configuration information,
- P is an integer greater than 1, and
- $N_i$ is an integer greater than or equal to 1 and less than P; and receiving configuration information from the network device, wherein:
- the configuration information configures at least two sounding reference signal (SRS) resources for a first frequency domain unit of the terminal device,
- the first frequency domain unit is associated with first uplink transmission configuration information, and
- SRS ports of the at least two SRS resources of the first frequency domain unit are associated with an antenna port supported by the first frequency domain unit.

* * * * *